United States Patent [19]
Beck et al.

[11] Patent Number: 5,239,627
[45] Date of Patent: Aug. 24, 1993

[54] BI-DIRECTIONAL PARALLEL PRINTER INTERFACE

[75] Inventors: James L. Beck, Versailles; James R. Booth, Nicholasville; James C. Buchanan, Lexington, all of Ky.; Margaret E. Claffey-Cohen, Jupiter, Fla.; Carl P. Cole, Lexington, Ky.; Timothy J. Louie; Alan F. Neel, II, both of Boca Raton, Fla.; Lynn M. Oliver, Lexington, Ky.; James P., Ward, Boca Raton, Fla.; James F. Webb, Lexington, Ky.

[73] Assignee: International Business Machines Corporation, Armonk, N.Y.

[21] Appl. No.: 678,929

[22] Filed: Mar. 26, 1991

[51] Int. Cl.[5] .......................... G06F 13/00; G06F 3/12
[52] U.S. Cl. .................................................. 395/275
[58] Field of Search ................. 364/DIG. 1, DIG. 2; 395/275

[56] References Cited

U.S. PATENT DOCUMENTS

| | | | |
|---|---|---|---|
| 4,651,278 | 3/1987 | Herzog et al. | 364/300 |
| 4,702,813 | 1/1988 | Kaneko | 395/275 |
| 4,825,404 | 4/1989 | Theus | 364/900 |

Primary Examiner—Robert L. Richardson
Attorney, Agent, or Firm—Frank C. Leach, Jr.; George E. Grosser

[57] ABSTRACT

A parallel interface connects a data processor and a printer so that each may transmit information to the other or receive information from the other. The transmitted information from the data processor can be data or status signals. The data or status signals are transmitted over the same eight information lines between the data processor and the printer with a predetermined signal being sent over another line from the data processor to the printer prior to transmission over the eight lines to identify whether the transmitted information is data or status signals. The printer sends status signals to the data processor over the same eight information lines after sending a predetermined signal to the data processor over a further line that it is going to transmit.

32 Claims, 29 Drawing Sheets

FIG. 3

| STATUS QUALIFIER (-INIT OR -ERROR) | REQUEST TO SEND (-SCLTIN OR +SLCT) | BUSY (-AUTOFD OR +BUSY) | INTERFACE STATE |
|---|---|---|---|
| FALSE (HIGH) | FALSE (HIGH) | FALSE (LOW) | READY TO RECEIVE |
| FALSE (HIGH) | FALSE (HIGH) | TRUE (HIGH) | NOT READY TO RECEIVE (IDLE STATE) |
| FALSE (HIGH) | TRUE (LOW) | FALSE (LOW) | RESERVED - DO NOT USE |
| FALSE (HIGH) | TRUE (LOW) | TRUE (HIGH) | REQUEST INTERFACE FOR DATA OR TRANSMIT DATA |
| TRUE (LOW) | FALSE (HIGH) | FALSE (LOW) | RESERVED - DO NOT USE |
| TRUE (LOW) | FALSE (HIGH) | TRUE (HIGH) | RESERVED - DO NOT USE |
| TRUE (LOW) | TRUE (LOW) | FALSE (LOW) | RESERVED - DO NOT USE |
| TRUE (LOW) | TRUE (LOW) | TRUE (HIGH) | CHANNEL BREAK, TRANSMIT STATUS, OR INITIALIZE |

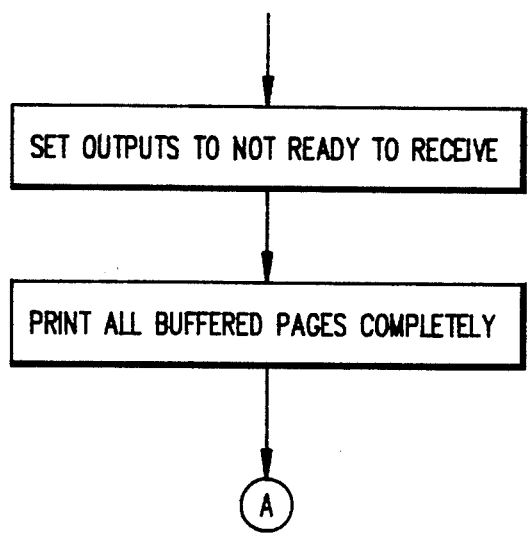

FIG. 5

| TIME | NAME | MIN (μSEC) | MAX (μSEC) | NOTES |
|---|---|---|---|---|
| T1 | −INIT LOW TIL +BUSY HIGH | | 1 | |
| T2 | −INIT WIDTH | 50 | | |
| T3 | −INIT LOW TO +BUSY LOW | | 500 | TIME TO PREP FOR STATUS |
| T4 | −INIT HIGH TO +BUSY HIGH | | 1 | |
| T5 | −INIT HIGH TO +BUSY LOW | | OPEN | TIME TO PRINT BUFFERED DATA |
| T6 | −ACK WIDTH | 0.5 | 4 | |

| TIME | NAME | MIN (μSEC) | MAX (μSEC) | NOTES |
|---|---|---|---|---|
| T1 | −INIT TO −SLCT SKEW | | ±.020 | |
| T2 | −INIT LOW TIL +BUSY HIGH | | 1 | |
| T3 | −INIT LOW TO +BUSY LOW | | 500 | GET READY FOR STATUS |
| T4 | −INIT HIGH TO +BUSY HIGH | | 1 | |

| TIME | NAME | MIN (μSEC) | MAX (μSEC) | NOTES |
|---|---|---|---|---|
| T1 | −ERROR TO +SLCT SKEW | | ±.020 | |
| T2 | −ERROR LOW TIL −AUTOFD LOW | | 75000 | GET READY FOR STATUS |
| T3 | −ERROR HIGH TIL −AUTOFD HIGH | | 75000 | REACT TO END OF STATUS |

| TIME | NAME | MIN (nSEC) | MAX (nSEC) | NOTES |
|---|---|---|---|---|
| T1 | DATA SETUP TO -STROBE LOW | 400 | | |
| T2 | -STROBE LOW TO -ACK LOW | 0 | | |
| T3 | -ACK LOW TO -STROBE HIGH | 0 | | |
| T4 | -STROBE HIGH TO -ACK HIGH | 0 | | |
| T5 | -ACK HIGH OR +BUSY LOW TO -STROBE LOW | 0 | | |
| T6 | -ACK LOW TO CHANGE DATA | 50 | | |
| T7 | -STROBE TIMEOUT | 500 | | MAX BASED ON AUTO STROBE TIMER IN PS/2 EQUAL TO DATA SETUP TIME |
| T8 | -ACK WIDTH | 400 | | |
| T9 | -ACK TO +BUSY SKEW | | ± 20 | |
| T10 | -STROBE HIGH TIME | 400 | | EQUAL TO DATA SETUP TIME |

BI-DIRECTIONAL PARALLEL PRINTER INTERFACE

FIELD OF THE INVENTION

This invention relates to a bi-directional parallel interface between two devices and, more particularly, to a bi-directional parallel printer interface between a data processor and a printer in which either may transmit signals to the other or receive signals from the other.

BACKGROUND OF THE INVENTION

A parallel printer interface has previously been used between an IBM PC and a printer. Information was transmitted only from the IBM PC to the printer since the printer was a unidirectional printer, that is, a printer capable of only receiving information. As a result, the unidirectional printer required a printer operator panel at the printer to enable an operator to ascertain why the printer could no longer receive data from the IBM PC, for example. Thus, this prior printer interface could not be efficiently utilized if the printer was remote from the operator such as when driving the printer via a Local Area Network (LAN) or when the printer was shared by a plurality of users.

The IBM PS/2 personal computer has a bi-directional parallel interface for using a software program, which is known as Data Migration Facility, in which data can be transferred from a 5¼" disk of the IBM PC to a 3½" disk of the PS/2 personal computer to enable transfer of data from an IBM PC to a PS/2 personal computer. However, the PS/2 personal computer has not been capable of receiving information from a printer nor has there been a printer capable of supplying information to the PS/2 computer if the PS/2 computer were capable of receiving the information. Therefore, even with the PS/2 computer, it has been necessary for the operator to be near the printer to allow the operator to view the printer operator panel to determine the problem whenever information could not be sent to the printer.

While the PS/2 computer has not been capable of receiving information from a printer, U.S. Pat. No. 4,651,278 to Herzog et al has communication from a host system to an all points addressable printer and vice versa by a printer interface to that the printer is bi-directional. However, there does not appear to be communication from the printer to the host system after printing begins. Therefore, information is not sent from the printer to the host system to inform a remote user of why information cannot be sent to the printer, for example.

The interface of the aforesaid Herzog et al patent is an independent interface using a specific language. The interface of the aforesaid Herzog et al patent also transmits the information in structured field data streams, which are blocks, and not bytes. Thus, there can be no interruption of each block in the aforesaid Herzog et al patent to permit the printer to communicate with the host system.

SUMMARY OF THE INVENTION

The interface of the present invention satisfactorily solves the problem of the printer being remote from the operator and the operator still being able to ascertain the status of the printer at any time without the operator having to physically go to the printer. The interface of the present invention transmits information byte by byte so that there can be an interruption at any byte boundary of the transmitted information by the receiver of the information or by the transmitter. This enables the data processor to stop sending information and to inquire of the printer why the printer is no longer accepting the information, for example.

The interface of the present invention also enables the printer to send information at any time after the data processor recognizes the printer's request to send information and the data processor stops sending information. This allows the printer to inform the data processor that a font, for example, required by the information transmitted to the printer from the data processor is not available in the printer.

The interface of the present invention accomplishes this through providing a first dedicated line between the data processor and the printer in which the data processor can inform the printer as to whether the information to be transmitted is data or status signals. The data signals would be print content signals for the printer to use for printing. The status signals, for example, would inquire as to why the printer was not accepting information. By informing the printer that status signals, which are system control signals, are to be transmitted, the printer does not have to save as much memory as is necessary when data signals, which are print content signals, are being sent to the printer.

The interface of the present invention also provides a second dedicated line between the data processor and the printer in which the printer can inform the data processor that the printer is going to send information to the data processor. This can be in response to the data processor's question so that the printer can explain to the data processor why the printer is not accepting information from the data processor. All information transmitted between the data processor and the printer is sent over the same eight information lines, which are separate from the dedicated lines.

The interface of the present invention also is capable of permitting the printer to communicate to the data processor that it wants to interrupt the incoming stream of data signals from the data processor to tell the data processor something. For example, the printer may want to inform the data processor that it does not have a specific font that has been called out in the data signals being sent to the printer by the data processor.

The interface of the present invention also is capable of utilization with unidirectional printers. An initial command signal from the data processor is not accepted by an unidirectional printer so that the unidirectional printer ignores signals usable only with a bi-directional printer, that is, a printer capable of transmitting or receiving information.

An advantage of this invention is to provide a parallel interface to enable communications of a data processor with both unidirectional and bi-directional printers.

Another advantage of this invention is to provide a parallel interface that enables a data processor to know whether it is communicating with a unidirectional or bi-directional printer.

A further advantage of this invention is to provide a dynamic parallel interface that enables communication between a data processor and a bi-directional printer in either direction at any time.

Still another advantage of this invention is to provide a parallel interface having a relatively high transfer rate of information.

BRIEF DESCRIPTION OF THE DRAWINGS

In the drawings:

FIG. 3 is a table showing levels of various signals at the data processor or printer producing interface states for the interface control protocols.

FIG. 5 is a flow chart showing initialization of the printer.

DETAILED DESCRIPTION

Figure 1:
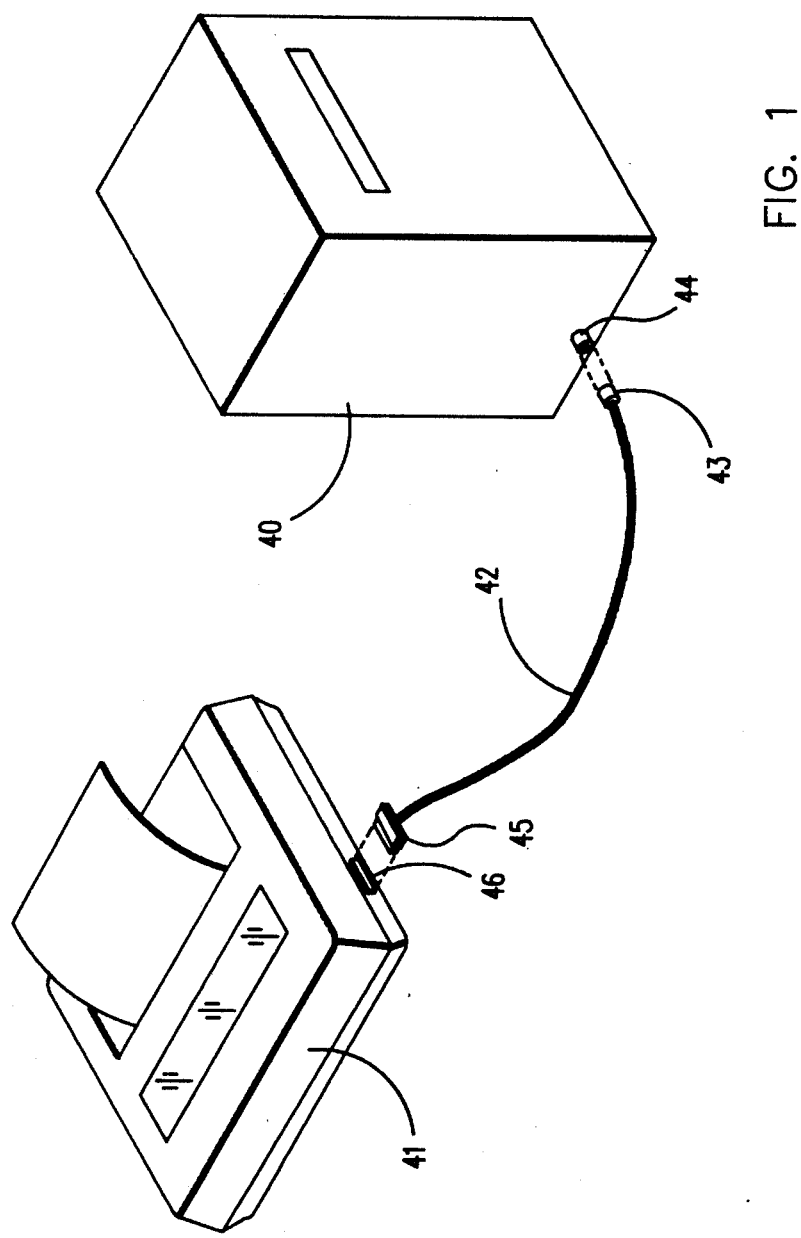
FIG. 1 is perspective view showing a data processor and a printer connected to each other by a parallel printer interface of the present invention.

Referring to the drawings and particularly FIG. 1, there is shown a PS/2 computer 40, which is a data processor, connected to a printer 41 by a cable 42. One suitable example of the cable 42 is sold by International Business Machines Corporation as Part No. 68X3949.

Figure 2:
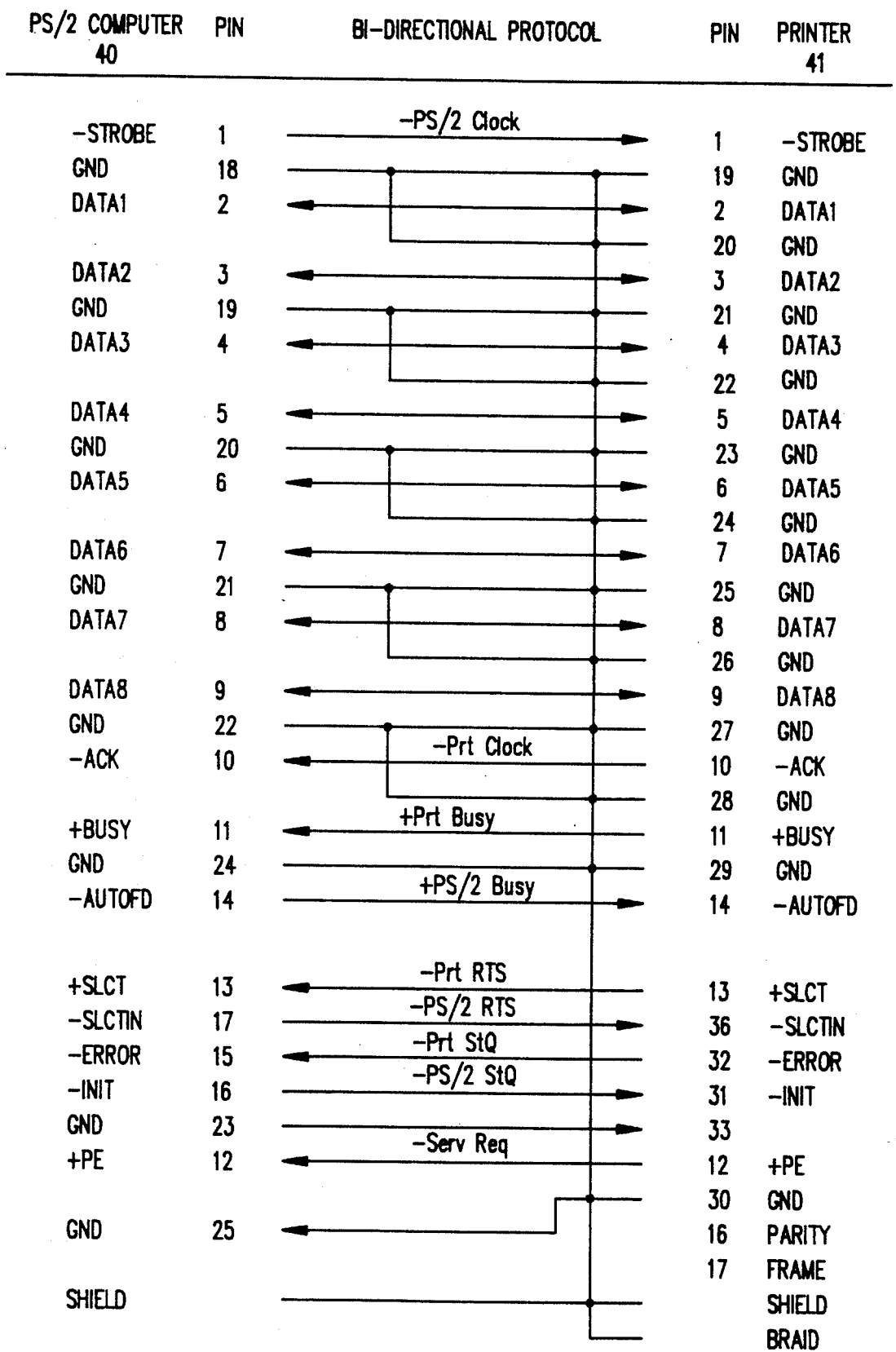
FIG. 2 is a schematic diagram of the parallel printer interface of the present invention showing connections between pins of a connector of the data processor and pins of a connector of the printer.

The cable 42 has a cable terminal connector 43 on one end connected to a twenty-five pin female D connector 44 of the PS/2 computer 40 and a cable terminal connector 45 at its other end connected to a thirty-six pin Centronics compatible connector 46 of the printer 41. The connections of the various pins of the connectors 44 and 46 are shown in FIG. 2 with the signal between the connected pins being shown at each pin. The direction of each signal is indicated by an arrow if unidirectional and by arrows on opposite ends if bi-directional. Some of the signals also are identified by a different name under the "Bi-Directional Protocol" heading.

The interface signals between the PS/2 computer 40 and the printer 41 are:

DATA1-8: Information signals for transmitting data or status signals from the PS/2 computer 40 to the printer 41 and status signals from the printer 41 to the PS/2 computer 40.

−STROBE: Clocks information into the printer 41 a byte at a time. When the PS/2 computer 40 is receiving information from the printer 41, this signal verifies the completed transfer of each byte to the PS/2 computer 40 from the printer 41. Totem pole drivers are used to improve the rise time of this signal.

−ACK: This signal acknowledges that the information has been received by the printer 41 through producing a negative going pulse to verify the completed transfer of each byte. When the PS/2 computer 40 is receiving information from the printer 41, this signal clocks the information into the PS/2 computer 40. Totem pole drivers are used to improve the rise time of this signal.

+BUSY: This signal provides a DC level (high) to indicate that the printer 41 cannot receive information, either data or status signals. This signal also is active when the printer 41 is off line or reporting an error. When this signal is low, the printer 41 can receive information. Totem pole drivers are used to improve the rise time of this signal.

−AUTOFD: This is the mirror image of +BUSY and is from the PS/2 computer 40 so that it is interpreted as +PS/2 Busy.

+SLCT: This signal from the printer 41 is interpreted as Printer Request to Send (−Prt RTS) when the PS/2 computer 40 is arbitrating for control of the parallel interface. This signal is normally held high by the printer 41 so as not to be requesting to send and goes low only when the printer 41 wants to send information.

−SLCTIN: This signal from the PS/2 computer 40 is interpreted as −PS/2 Request to Send (−PS/2 RTS) and is transmitted to lock control of the parallel interface for transmitting information from the PS/2 computer 40. This signal must be set low (−PS/2 RTS=True) to cause the printer 41 to drop its +BUSY signal and receive information, either data or status signals, from the PS/2 computer 40.

−INIT: This signal is interpreted as −PS/2 Status Qualifier (−PS/2 StQ) when transmitted from the PS/2 computer 40 in the bi-directional mode. When this signal goes low, it causes +BUSY to go high until the printer 41 is prepared to receive status signals from the PS/2 computer 40 at which time the printer 41 will set +BUSY low. This signal must be left low for the duration of transmission of the status signals. Since this signal is used by the PS/2 computer 40 to initialize the printer 41 and the PS/2 computer 40 may initialize the printer 41 at any time with the printer 41 in any mode, the PS/2 computer 40 must not allow −STROBE to fall during a printer initialization sequence.

−ERROR: This signal from the printer 41 is the mirror image of −INIT. This signal is interpreted as −Printer Status Qualifier (−Prt StQ) when the printer 41 is in the bi-directional mode.

+PE: This signal is interpreted as −Service Request (−Serv Req) when the printer 41 is in the bi-directional mode. When the printer 41 detects a condition that the PS/2 computer 40 has armed it to detect, this signal will be set low until the PS/2 computer 40 has been informed of the detection.

While the connections between the connectors 44 (see FIG. 1) and 46 have been shown in FIG. 2 for use with the lines of the cable 42 (see FIG. 1), it should be understood that a new cable could be utilized instead of the cable 42 in which the pin 25 (see FIG. 2) of the connector 44 (see FIG. 1) of the PS/2 computer 40 can be connected to PARITY rather than to ground. The new cable also would connect the pin 25 of the connector 44 (see FIG. 1) to pin 16 of the connector 46 (see FIG. 1) of the printer 41 rather than pin 30 (see FIG. 2). This arrangement would be utilized when parity is to be generated and checked.

When the PS/2 computer 40 (see FIG. 1) and the printer 41 are powered on, each assumes that it is operating in a mode in which the printer 41 is unidirectional rather than bi-directional. The basic assumptions are that data transfer is unidirectional from the PS/2 computer 40 to the printer 41, the printer 41 can accept data as long as +BUSY is not active, the printer 41 will correctly capture data from the PS/2 computer 40 if the correct set up, STROBE width, and hold time requirements are met, the printer 41 will verify receipt of a byte by pulsing −ACK, and the printer 41 may be initialized at any time, whether +BUSY is high or low, by the PS/2 computer 40 sending a −INIT signal active (low) for at least fifty microseconds, and the printer 41 will proceed to print all queued data before setting +BUSY low.

To activate the bi-directional mode so that the printer 41 can transmit information as well as receive it, the PS/2 computer 40 must perform the following sequence of operations:

1. Attempt to send any Status Command:
   (a) The PS/2 computer 40 sets −INIT low and the printer 41 will respond by setting +BUSY high (+BUSY need not be low to start);
   (b) When the printer 41 is prepared to receive the Status Command, it will set +BUSY low to allow the Status Command to be sent. If the printer 41 does not set +BUSY low within 500 microseconds, the PS/2 computer 40 can assume that the printer 41 is unidirectional or bi-directional but cannot respond due to hardware fault.
2. Release control of the interface and wait for response of the printer 41:
   (a) The printer 41 will respond to the Status Command within 0.5 second when it is bi-directional;
   (b) If no response is received within 0.5 second, the PS/2 computer 40 should assume that the printer 41 is only capable of unidirectional operation.
3. If no response is forthcoming, the printer 41 is initialized by the PS/2 computer 40 setting the −INIT signal low for at least fifty microseconds to assure that the PS/2 computer 40 and the printer 41 will remain in sync if the printer 41 is bi-directional but is unable to respond due to an electrical fault in the interface.
4. If a response is received, the PS/2 computer 40 knows that the printer 41 is in the bi-directional mode and will only return to Receive Only if commanded by the PS/2 computer 40, initialized, or powered off.

When operating in the bi-directional mode, interface ownership by the PS/2 computer 40 or the printer 41 and the Data Status Channel transmissions are managed by the use of a state model of the Interface Control protocols (see FIG. 3) in which the allowed states are defined. These states are indicated by examining the levels of Status Qualifier (StQ), Busy, and Request to Send (RTS) signals from the PS/2 computer 40 or the printer 41.

The interface states of FIG. 3 are as follows:

READY TO RECEIVE

When in this state, the PS/2 computer 40 or the printer 41 is completely prepared to receive Data or Status bytes. For example, the PS/2 computer 40 has allocated a buffer for the incoming bytes, is aware if the bytes are Data or Status, and has completely programmed the Direct Memory Access (DMA) or Bus Master (interface) hardware to accept bytes if these facilities are to be used. When a transmitter sees this state in a receiver, it may begin transfer of information immediately.

If the PS/2 computer 40 or the printer 41 is in this state and receiving Data or Status Channel bytes, it may return to NOT READY TO RECEIVE when its counterpart leaves the TRANSMIT DATA or TRANSMIT STATUS state.

This state is the idle state of a unidirectional printer.

NOT READY TO RECEIVE

The printer 41 or the PS/2 computer 40 enters this state when it is processing a previously received byte, is off line, is processing a change of the StQ or RTS input signal, is changing to another state, or is idle. When the transmitter sees its receiver in this state, it should not transfer bytes. If the PS/2 computer 40 or the printer 41 enters this state from the READY TO RECEIVE state asynchronously, it must be capable of taking up to one byte because of a race with the other of the PS/2 computer 40 and the printer 41. This is the normal idle state of the PS/2 computer 40 or the bi-directional printer 41.

REQUEST INTERFACE FOR DATA

When the PS/2 computer 40 is in this state, it is attempting to gain control of the interface to transmit data. After waiting a one microsecond minimum "de-race" delay without encountering its RTS input signal going true as long as its StQ signal remains false, the PS/2 computer 40 will transition to the TRANSMIT DATA state as soon as the printer 41 goes READY TO RECEIVE.

TRANSMIT DATA

When the PS/2 computer 40 is in this state, it has control of the interface and is actively transmitting on the logical Data channel. DMA or Bus Master transmission should not be initiated until this state is reached. The PS/2 computer 40 will exit this state upon completing the transmission requested or if its StQ or RTS input signal goes true. The PS2/computer 40 must recognize the printer 41 is in the READY TO RECEIVE state and send a byte at least every ten milliseconds. If the PS/2 computer 40 cannot transmit a byte within the required ten milliseconds, it should drop control of the interface until the data is available.

SEND A CHANNEL BREAK

If the PS/2 computer 40 is in this state, it is attempting to gain control of the interface to transmit Status signals. It will transition to the TRANSMIT STATUS state after waiting a one microsecond minimum "de-race" delay without encountering the StQ input signal going true when the printer 41 is in the READY TO RECEIVE state.

If the printer 41 is in this state, it is attempting to gain control of the interface to send a response to a previous request from the PS/2 computer 40. The printer 41 will enter the TRANSMIT STATUS state after waiting the one microsecond minimum "de-race" delay without encountering the StQ input going true when the PS/2 computer 40 enters the READY TO RECEIVE state.

TRANSMIT STATUS

This state is used to actively send Status information. DMA or Bus Master transmission should not be initiated until this state is reached. The PS/2 computer 40 or the printer 41 will exit this state upon completing the transmission requested or if its StQ input signal goes true.

The PS/2 computer 40 or the printer 41 must recognize its counterpart is in its READY TO RECEIVE state and send a byte at least every ten milliseconds. If it cannot transmit a byte within the required ten milliseconds, it should drop control of the interface until the data is available.

Figure 4:
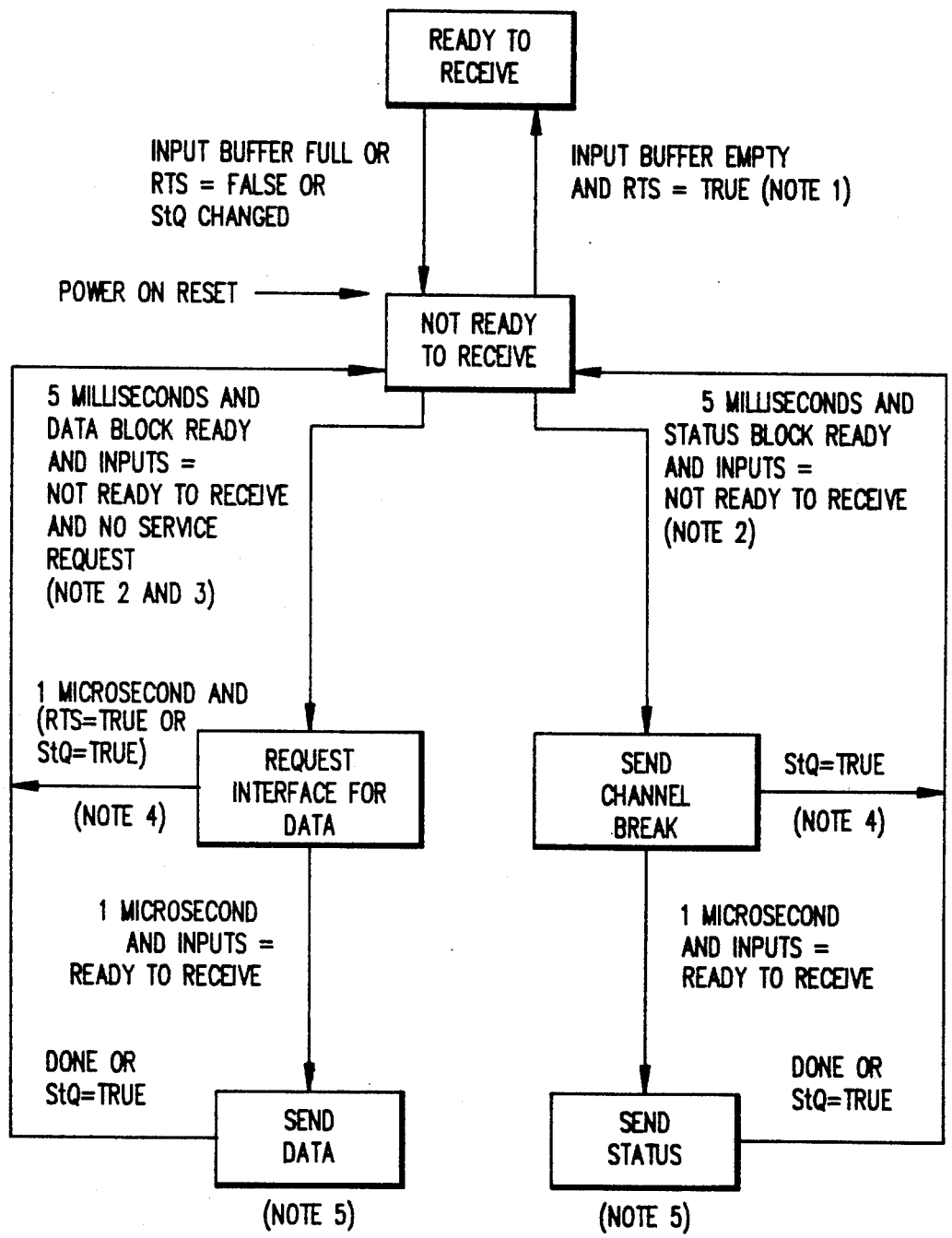
FIG. 4 is a diagram of the interface states and the conditions under which there may be transition from one state to another.

The flow chart of FIG. 4 discloses a schematic representation of the defined states, the allowed transitions, and the requirements to make a transition. In FIG. 4, the name of the state in the box describes the condition of the outputs of the PS/2 computer 40 or the printer 41, and the notations on the path lines describe the required state of the inputs that must be present to take that specific path.

The following explains the notes referenced on FIG. 4:

1. As the PS/2 computer 40 or the printer 41 enters the READY TO RECEIVE state, the level of the StQ signal should be noted to determine if Data or Status information is being received. For the PS/2 computer 40 receiving in the Programmed Input Output (PIO) mode, the state of −ERROR should be noted as every byte is received.

2. The five millisecond minimum dwell time in the NOT READY TO RECEIVE state is only required when transmitting to the PS/2 computer 40 to assure that the PS/2 computer 40 will not mix data and status transmission. Since the PS/2 computer 40 in the PIO mode has no hardware to cause interrupt upon change of any of its −ERROR (StQ), +SLCT (RTS), or +BUSY (Busy) input, each byte must be noted and compared against expectation of Data or Status information as it is received by checking the level of the −ERROR signal.

For the PS/2 computer 40 using DMA Slave or Bus Master capabilities, interrupts may be generated upon change of its −ERROR (StQ), +SLCT (RTS), or +BUSY (Busy) input. The five millisecond dwell time allows the PS/2 computer 40 to properly service these interrupts.

3. While in the NOT READY TO RECEIVE state, the PS/2 computer 40 will prepare a "What" status command in response to the printer 41 posting a Service Request (+PE=low).

4. Unequal delays are used to prevent repeated collision for interface control.

5. The PS/2 computer 40 or the printer 41 must recognize its counterpart is in READY TO RECEIVE and send a byte at least every ten milliseconds. If the PS/2 computer 40 or the printer 41 cannot transmit a byte within the required ten milliseconds, it should drop control of the interface until the information is available.

While the printer 41 is not shown and described as transmitting data to the PS/2 computer 40 so that it does not enter the REQUEST INTERFACE FOR DATA or TRANSMIT DATA state, it should be understood that the printer 41 could transmit data to the PS/2 computer 40. Thus, only −ERROR would have to change its level for this to occur, and the REQUEST INTERFACE FOR DATA and TRANSMIT DATA states would be applicable to the printer 41.

All of the Interface Control protocols are implemented in the PS/2 computer 40 and the printer 41 in microcode so that they are designed to be tolerant for a wide variance in the times between steps of the protocol.

Figure 6:
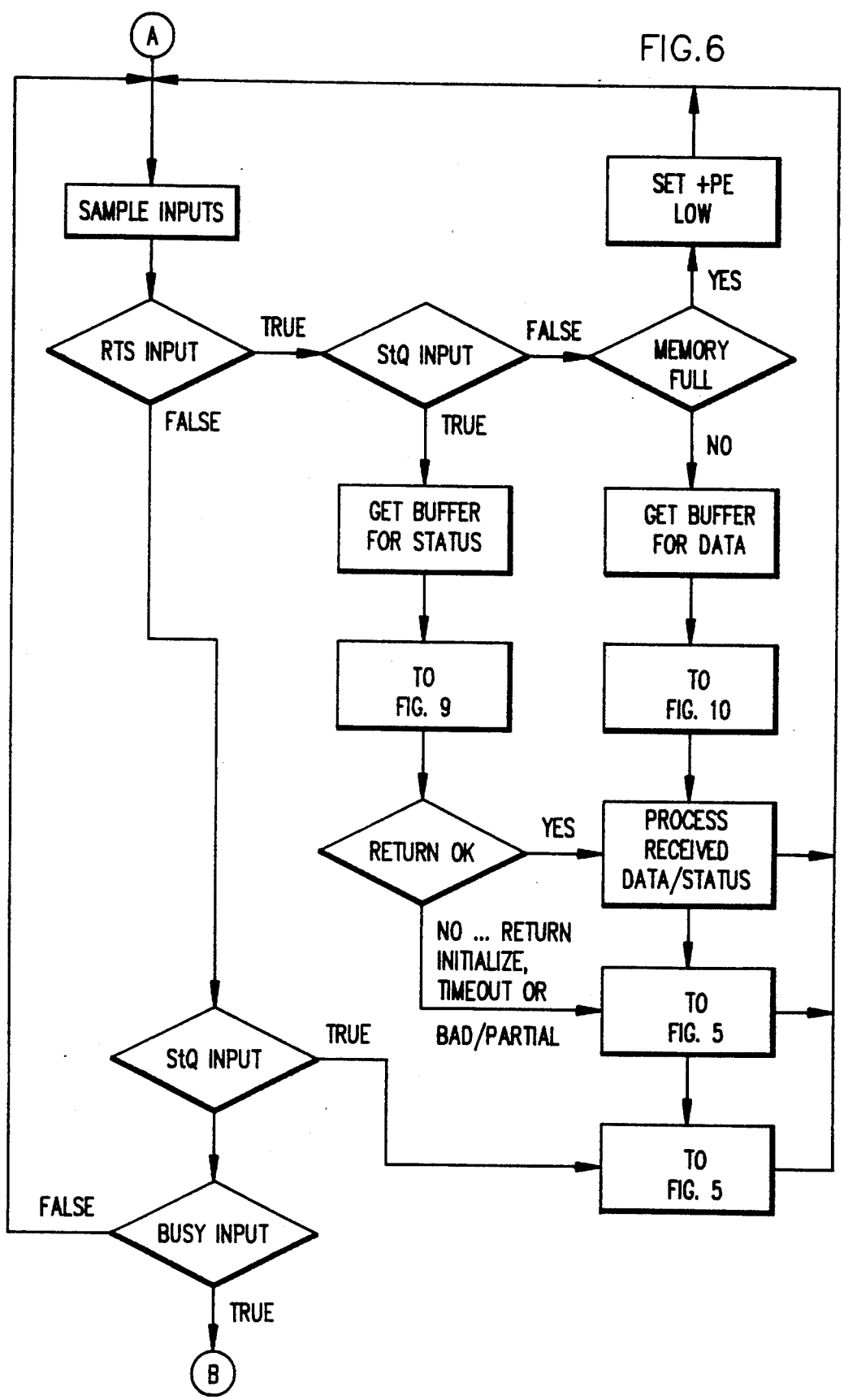
FIGS. 6-8 are flow charts showing a main loop of the printer.
Figure 7:
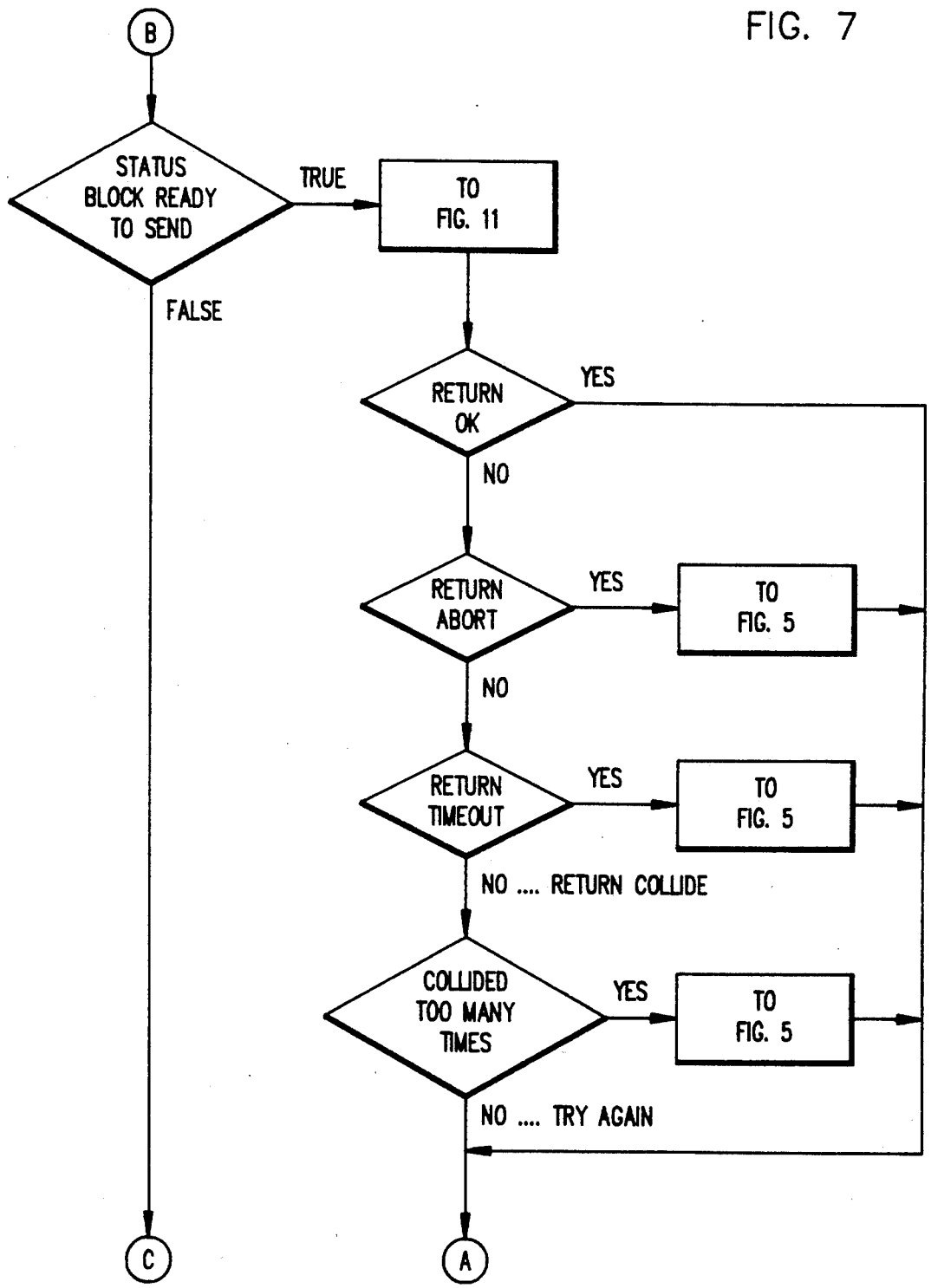
Figure 8:
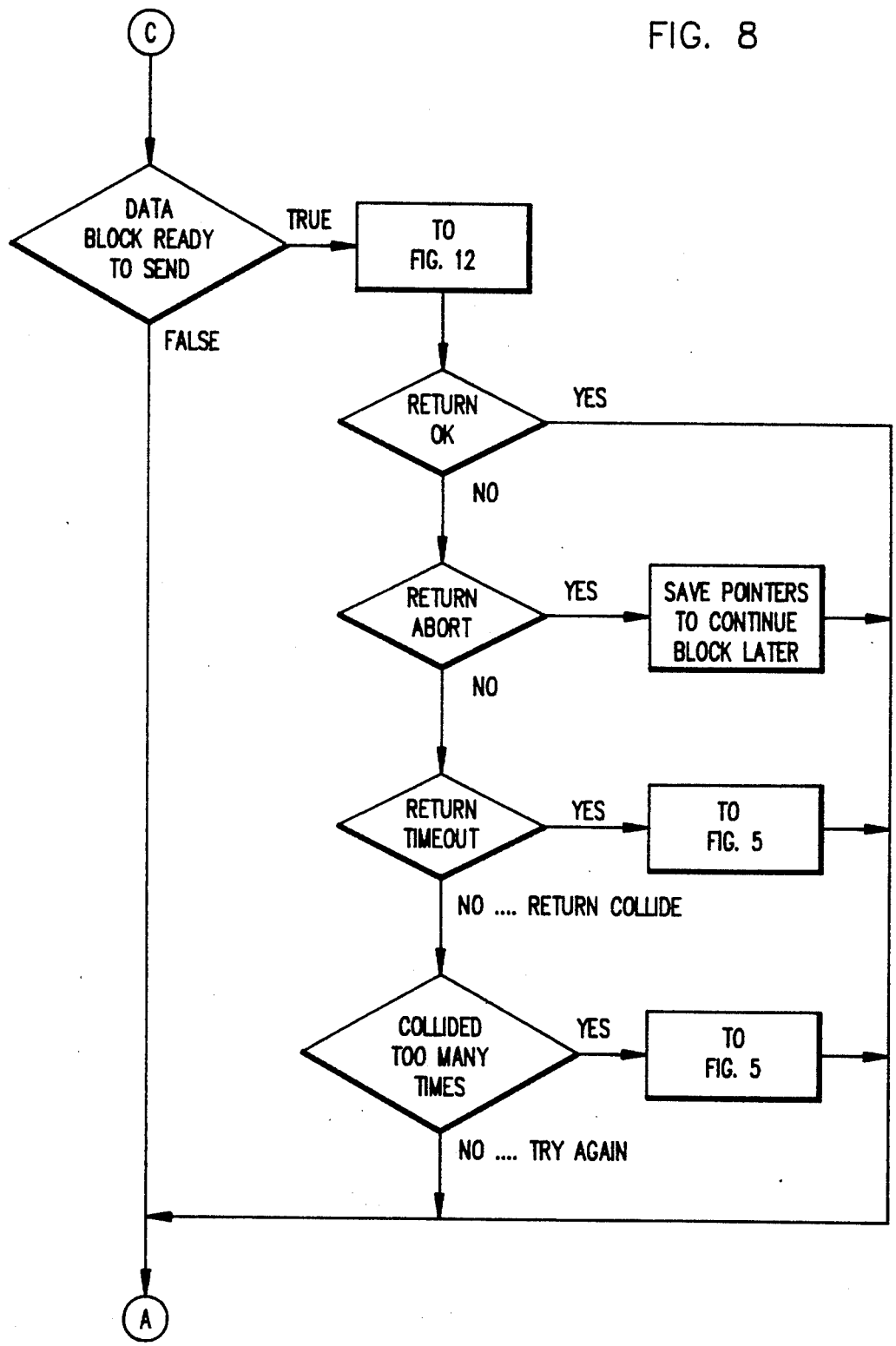
Figure 9:
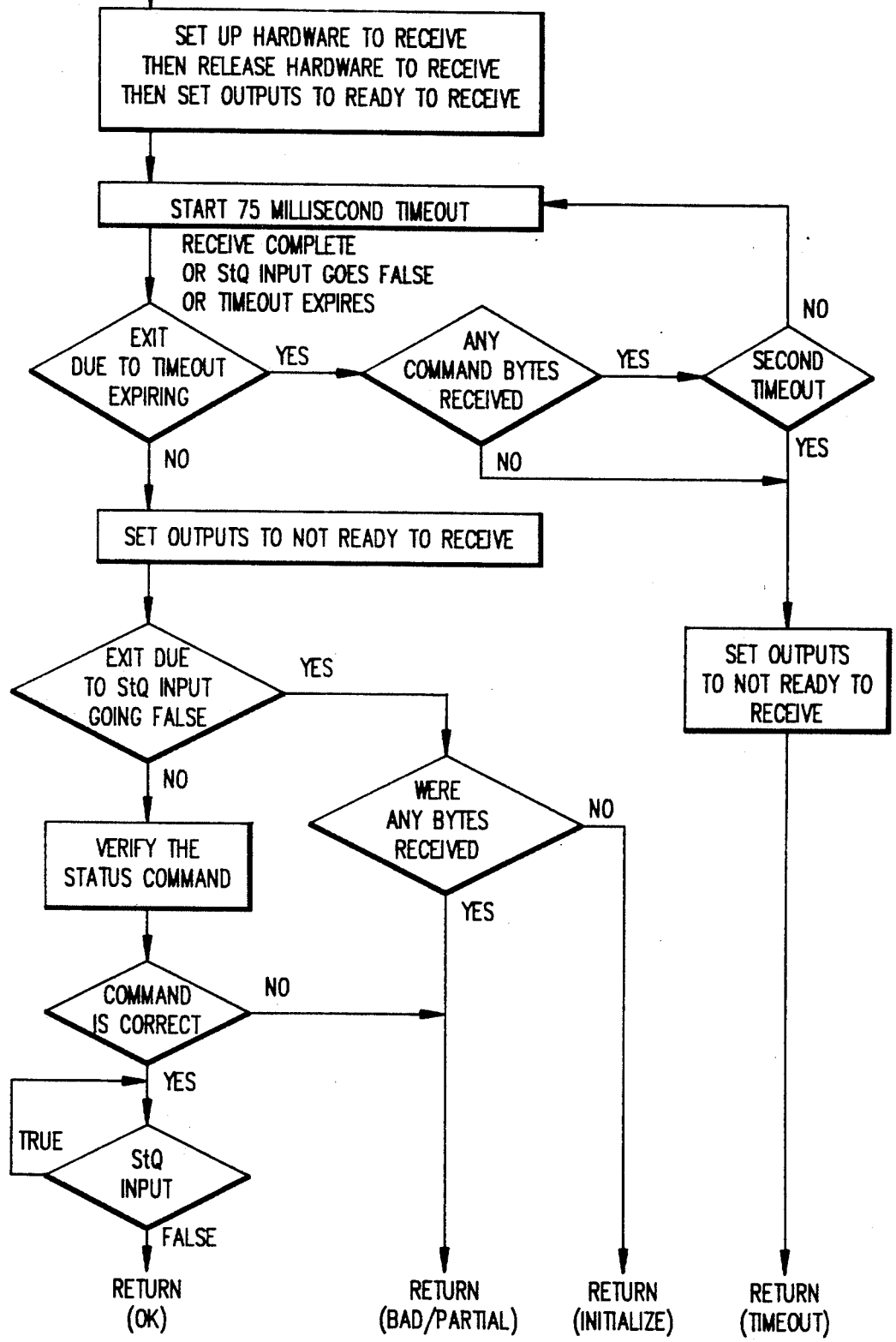
FIG. 9 is a flow chart showing a receiving status channel operation of the data processor or the printer.
Figure 10:
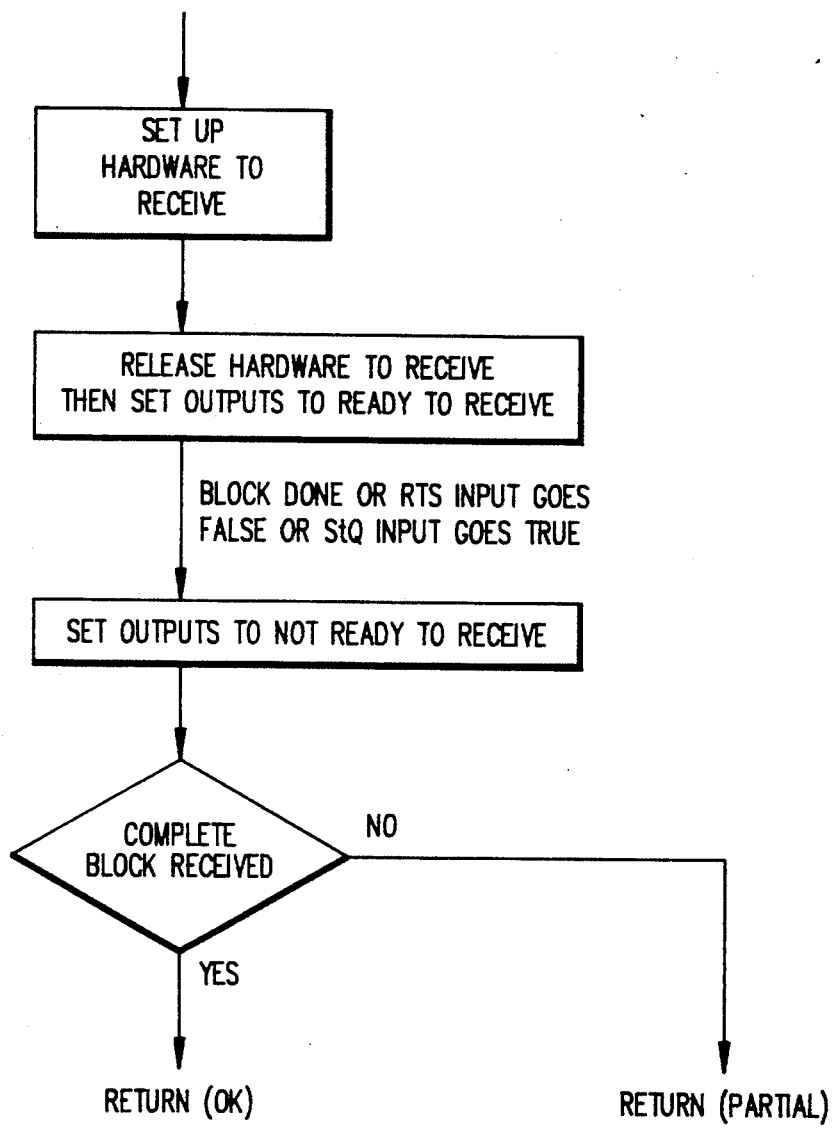
FIG. 10 is a flow chart showing a receiving data channel operation of the data processor or the printer.
Figure 11:
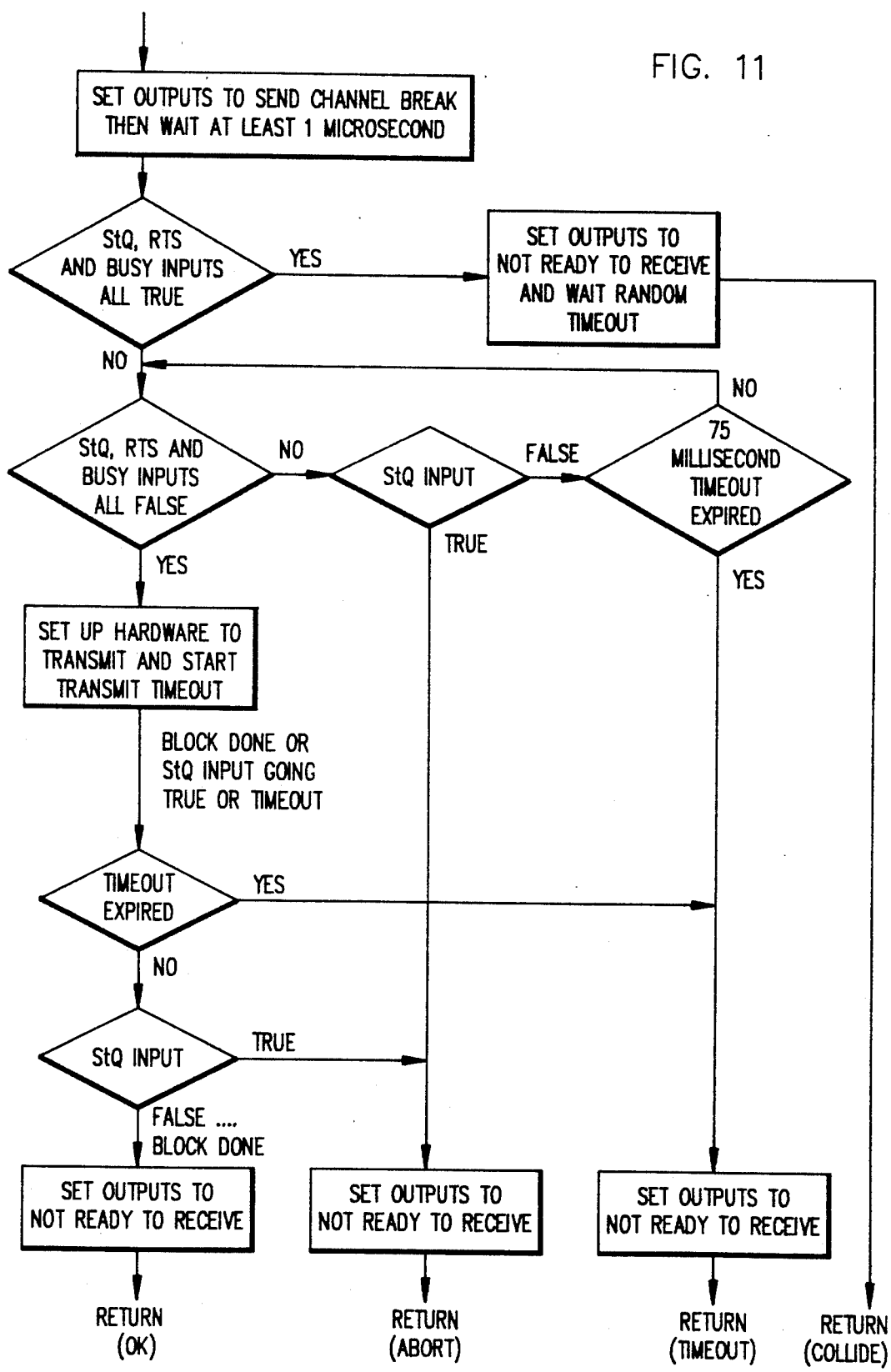
FIG. 11 is a flow chart showing a transmit status channel operation of the data processor or the printer.
Figure 12:
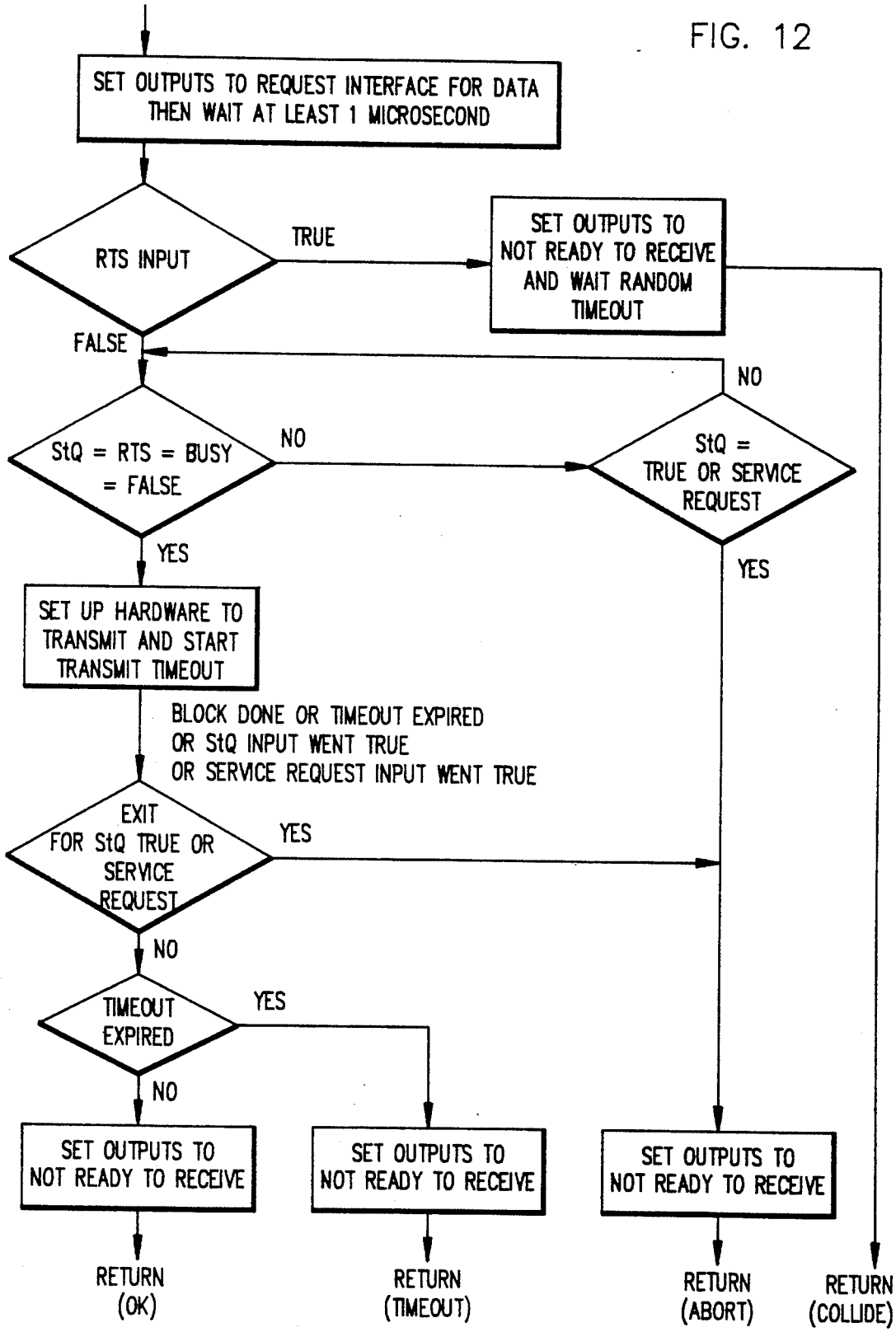
FIG. 12 is a flow chart showing a transmit data channel operation of the data processor.
Figure 13:
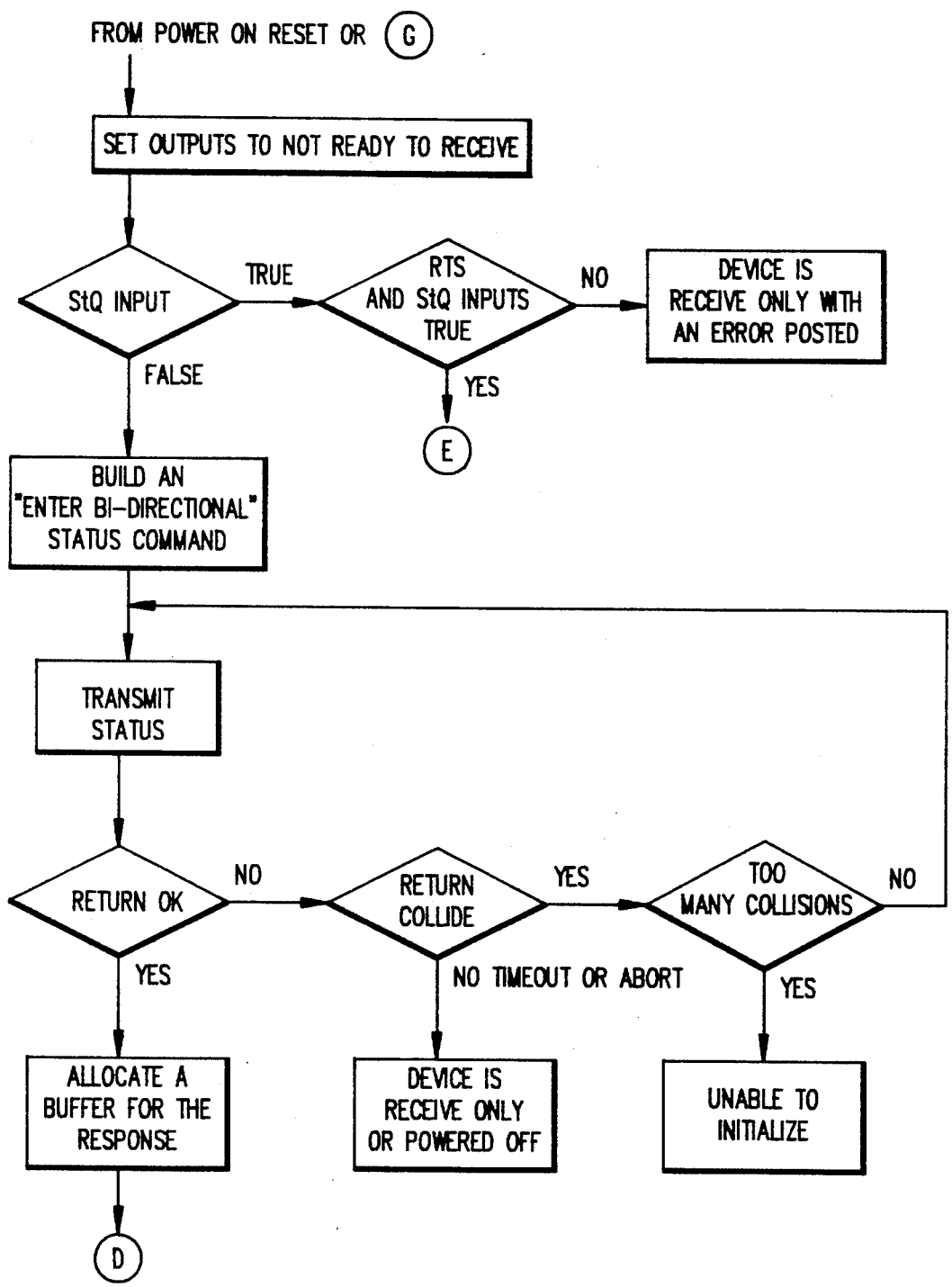
FIG. 13-15 are flow charts showing initialization of the data processor.
Figure 14:
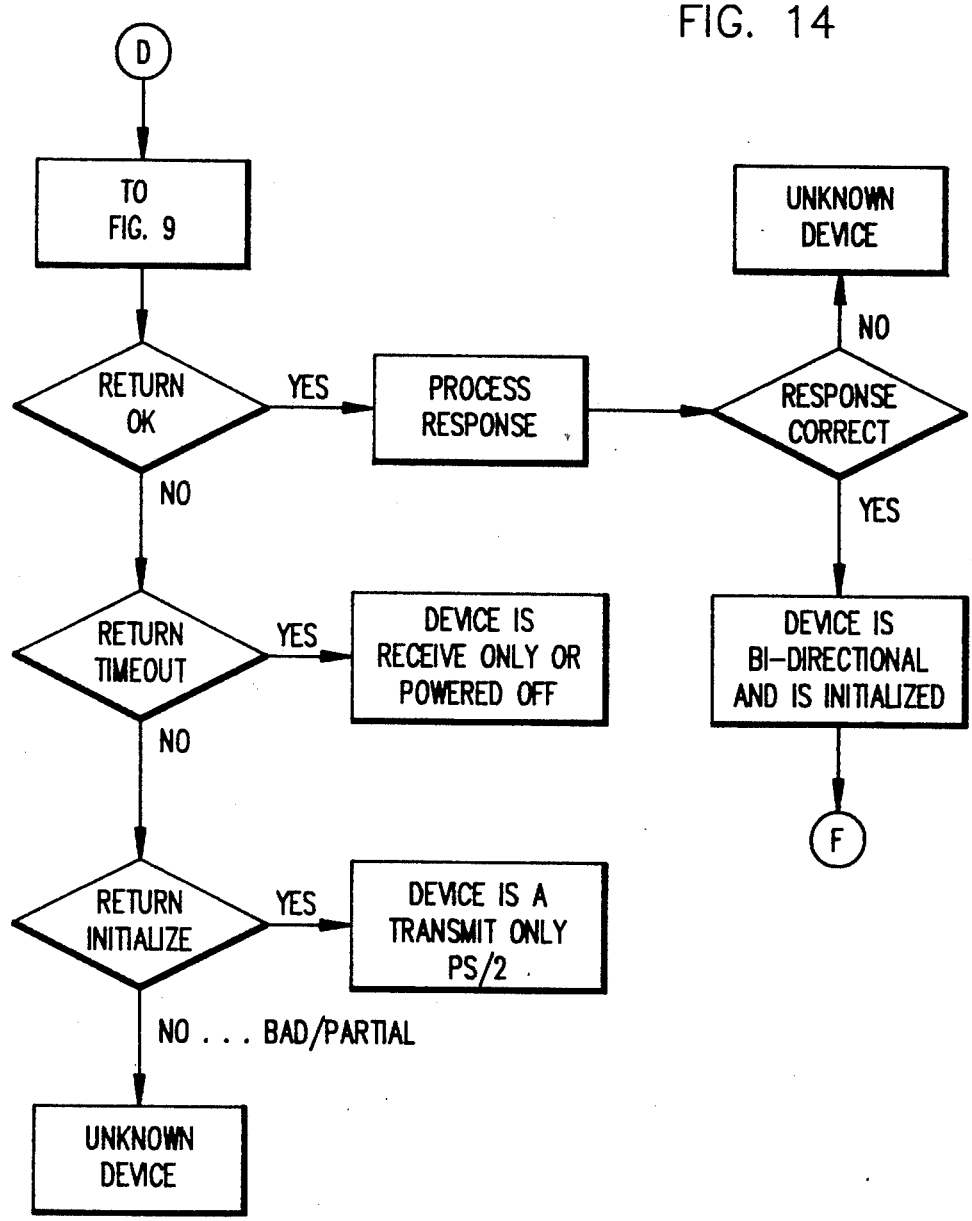
Figure 15:
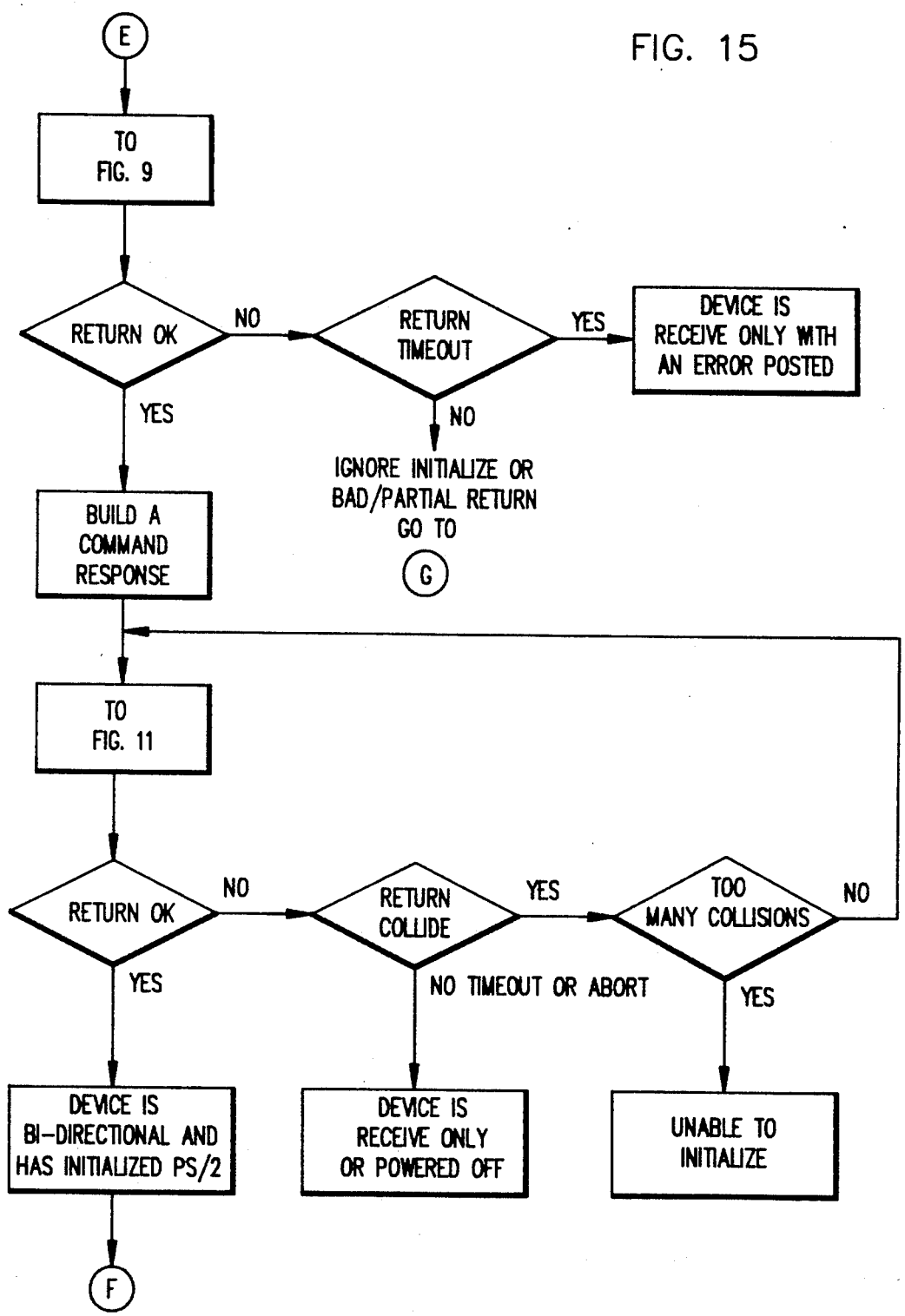
Figure 16:
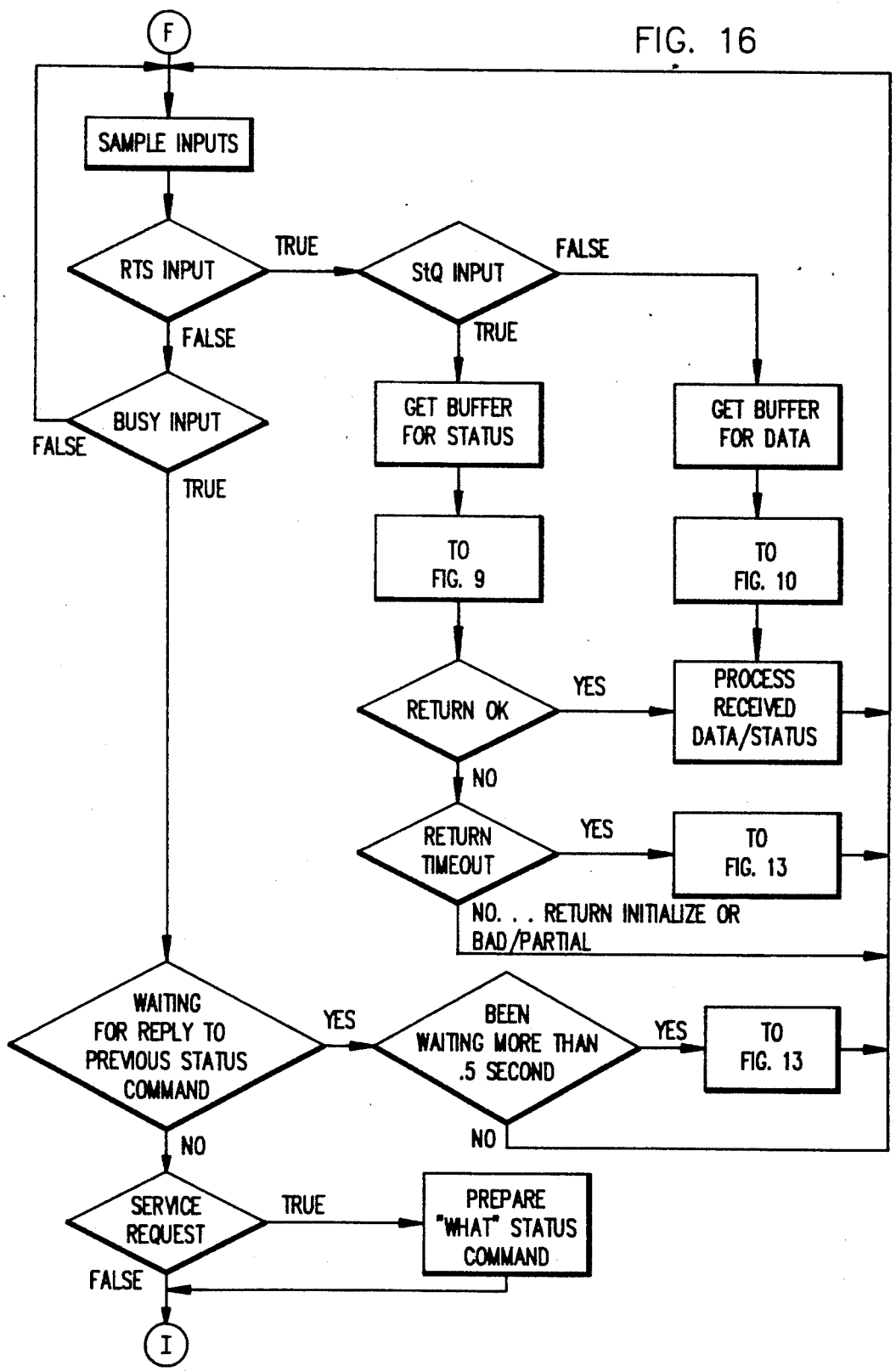
FIG. 16-18 are flow charts showing a main loop of the data processor.
Figure 17:
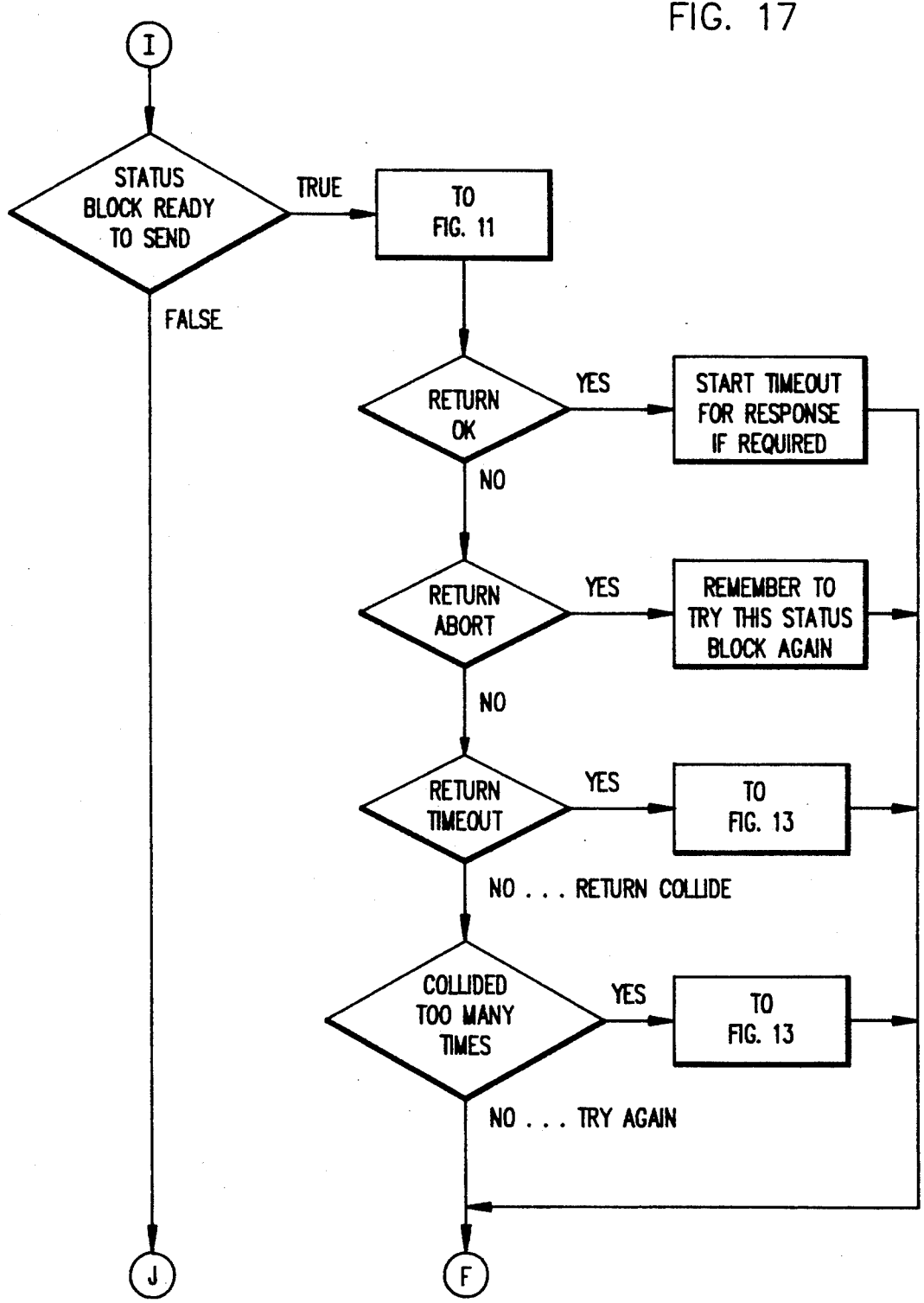
Figure 18:
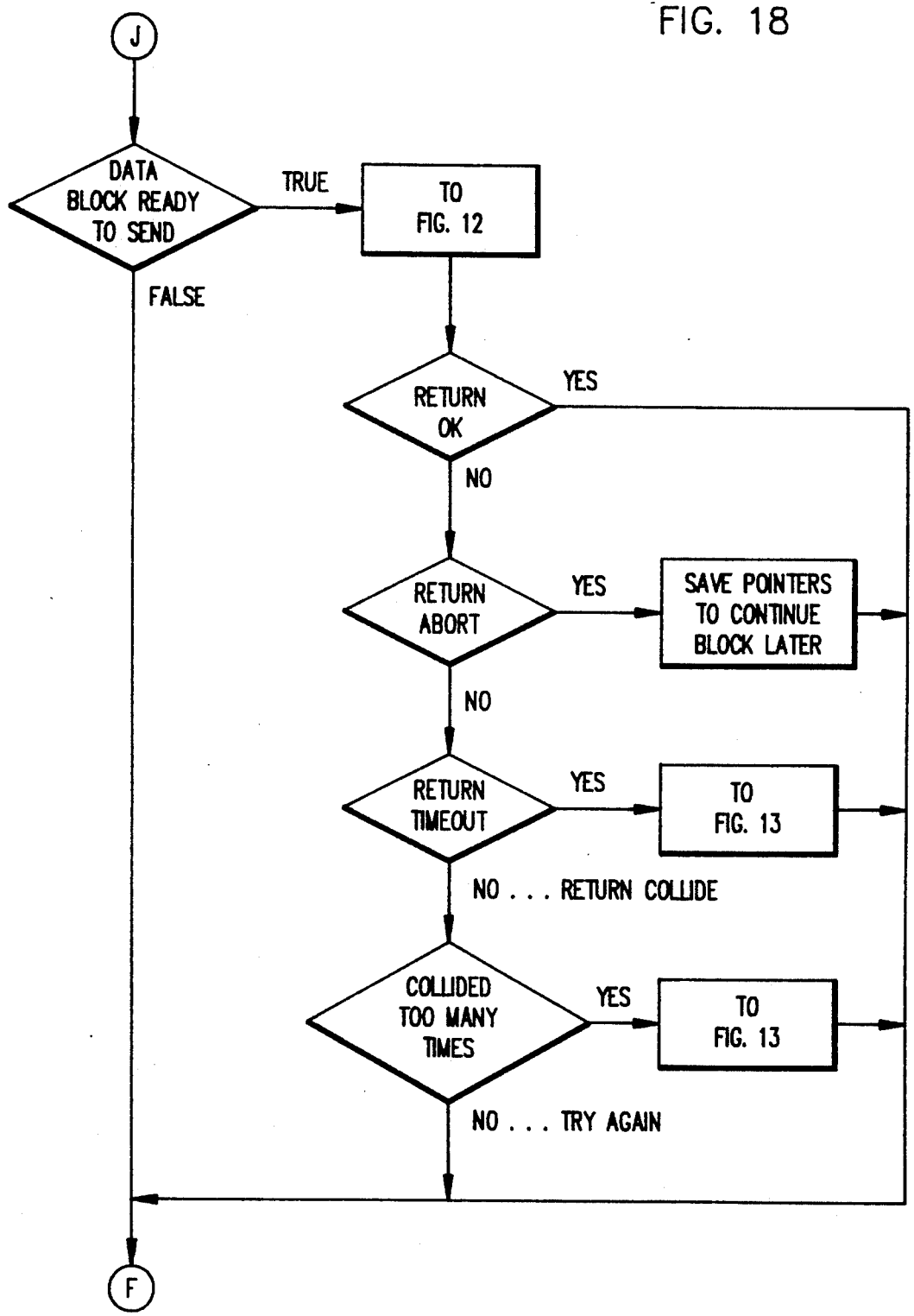

The flow charts of FIGS. 5-18 disclose the Interface Control protocols with FIG. 5 showing initialization of the printer 41, FIGS. 6-8 disclosing the main loop of the printer 41, FIG. 9 showing the receive status channel, FIG. 10 disclosing the receive data channel, FIG. 11 showing the transmit status channel, FIG. 12 disclosing the transmit data channel, FIGS. 13-15 disclosing initialization of the PS/2 computer 40, and FIGS. 16-18 showing the main loop of the PS/2 computer 40. Whenever a flow chart has a block referring to another figure, this means to refer to that figure and perform the steps of the flow chart of that figure.

Figures 19, 20:
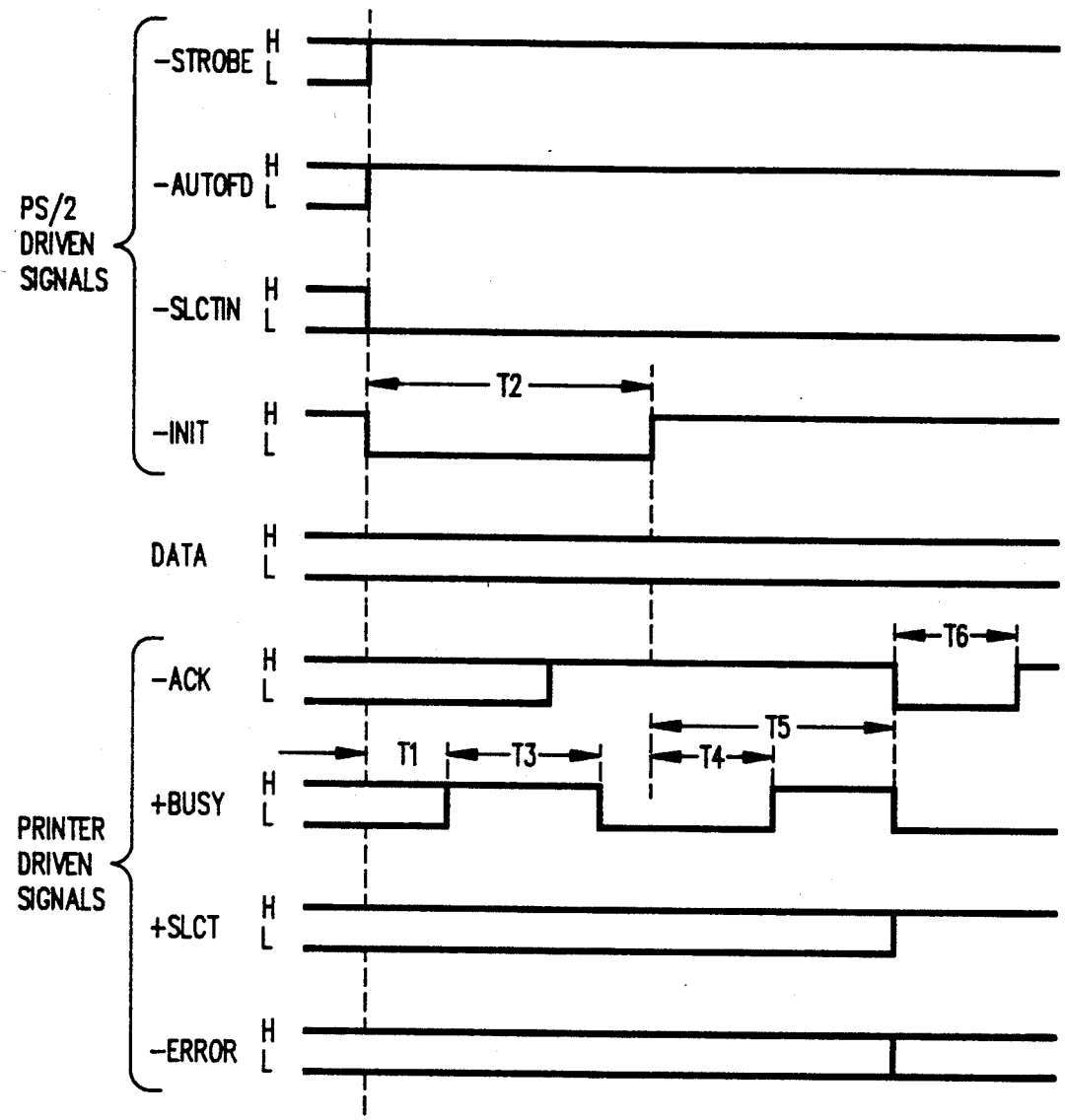
FIG. 19 is a timing diagram showing the relationship between signals driven by the printer and signals driven by the data processor when the data processor initializes the printer through the interface of the present invention.
FIG. 20 is a table showing the duration of each timing signal of FIG. 19.

Initialization of the printer 41 by the PS/2 computer 40 may occur at any time. Initialization of the printer 41 occurs during power on reset or when certain conditions occur in the flow charts of FIGS. 6-8. FIG. 19 shows the timing relationship of the signals driven by the PS/2 computer 40 and the printer 41 during initialization of the printer 41. FIG. 20 discloses the time for each of T1 to T6 in FIG. 19.

The printer 41 will print all buffered data before dropping +BUSY after −INIT rises to cause initialization of the printer 41. The printer 41 assumes the falling edge of a −INIT signal is a CHANNEL BREAK signal by the PS/2 computer 40 with −SLCTIN low and +BUSY may be dropped to allow receipt of Status information. The printer 41 sets +BUSY high as a result of the falling or rising edge of −INIT through hardware, but the microcode of the printer 41 sets +BUSY low shortly after it goes high and then +BUSY paces incoming Status information.

Figures 21, 22:
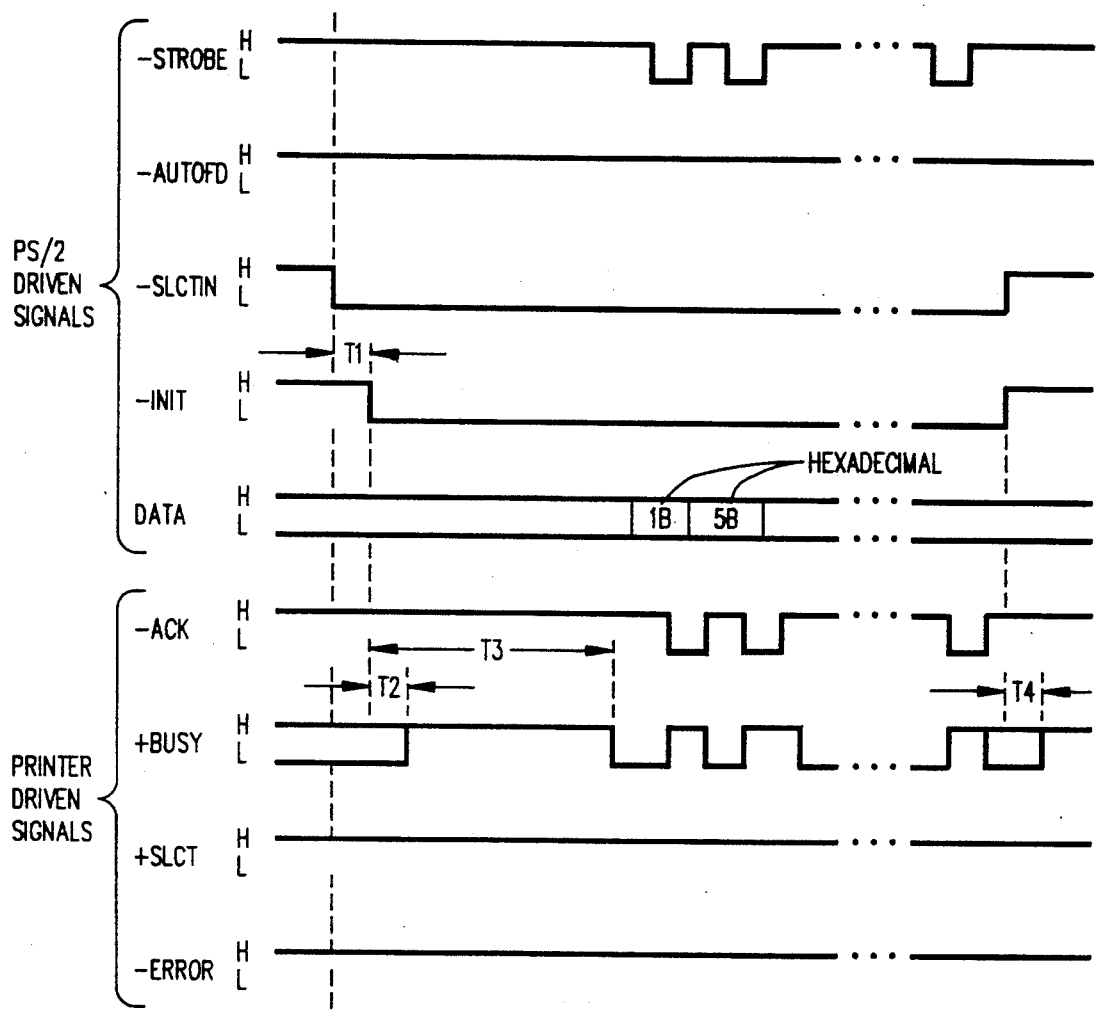
FIG. 21 is a timing diagram showing the relationship between signals driven by the data processor and signals driven by the printer when the data processor is seeking use of the interface of the present invention to transmit status signals to the printer.
FIG. 22 is a table showing the duration of each timing signal of FIG. 21.

When the PS/2 computer 40 wants to request the interface for transmission of Status information to the printer 41, the printer 41 must be in its NOT READY TO RECEIVE state to enable this transaction to begin. FIG. 21 shows the timing relationship of the signals driven by the PS/2 computer 40 and the printer 41. FIG. 22 discloses the time for each of T1 to T4 of FIG. 21.

Figures 23, 24:
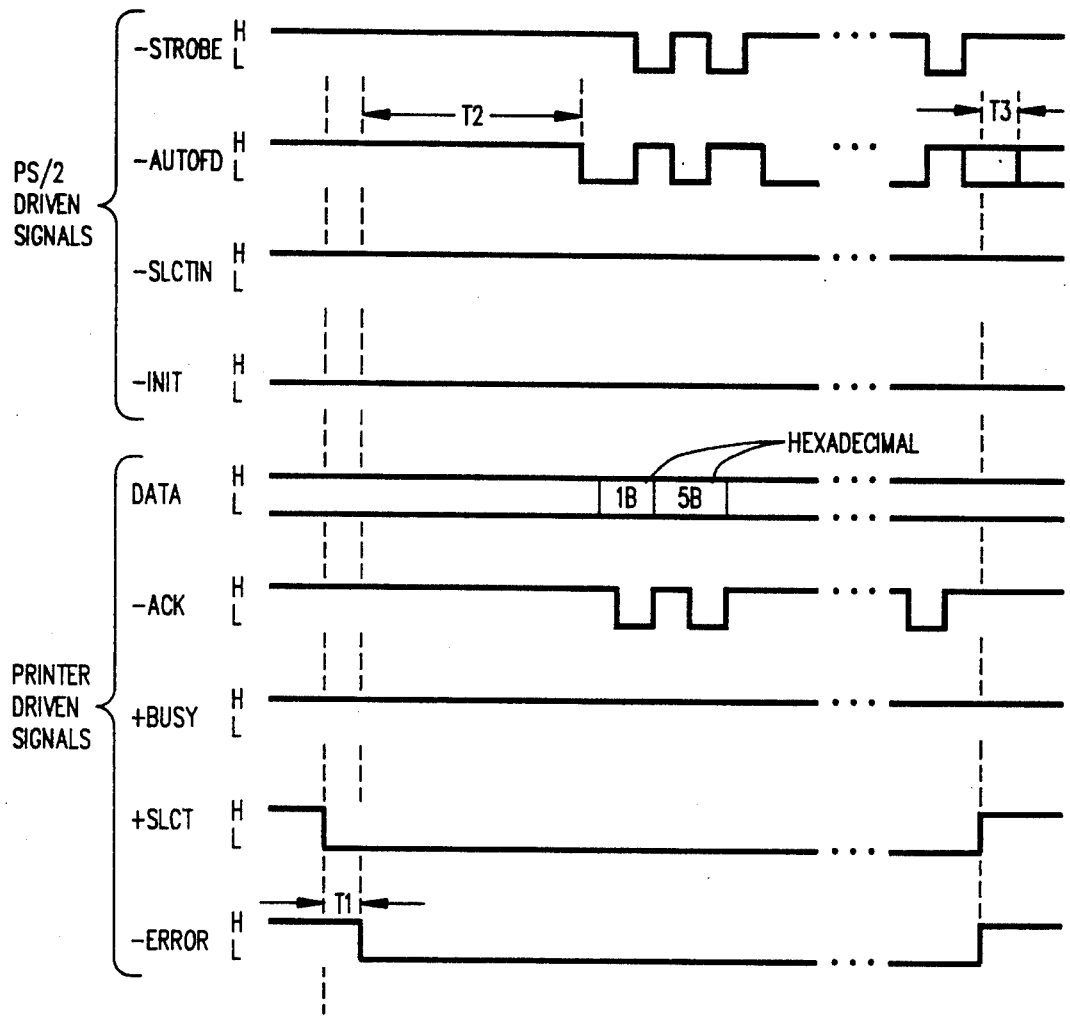
FIG. 23 is a timing diagram showing the relationship between signals driven by the data processor and signals driven by the printer when the printer is seeking to use the interface of the present invention to send status signals to the data processor.
FIG. 24 is a table showing the duration of each timing signal of FIG. 23.

When the printer 41 wants to request the interface to transmit Status information to the PS/2 computer 40 (This is called CHANNEL BREAK.), the PS/2 computer 40 must be in its NOT READY TO RECEIVE status. FIG. 23 discloses the timing relationship of the signals driven by the PS/2 computer 40 and the printer 41, and the time for each of T1 to T3 of FIG. 23 is in FIG. 24.

Figures 25, 26:
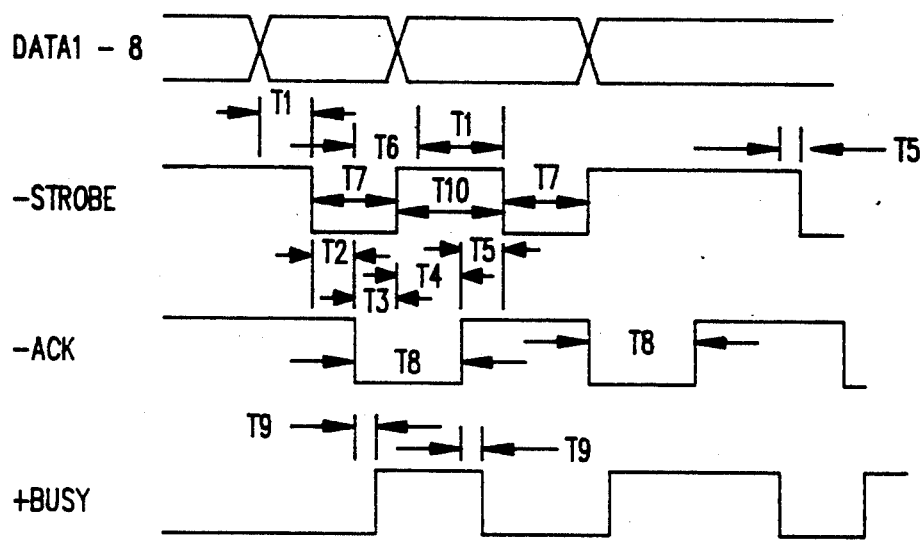
FIG. 25 is a timing diagram showing the relationship between signals from the data processor and signals from the printer when there is a byte by byte transfer from the data processor to the printer or vice versa.
FIG. 26 is a table showing the duration of each timing signal of FIG. 25.

Bytes of information are sent from the PS/2 computer 40 to the printer 41 or vice versa through a "Closed Loop Handshake." FIG. 25 discloses the timing relation for transmitting each byte from the PS/2 computer 40 to the printer 41, and the time for each of T1 to T10 of FIG. 25 is in FIG. 26. When bytes of information are being transmitted from the printer 41 to the PS/2 computer 40, −STROBE and −ACK should be swapped in FIG. 25, and +BUSY of FIG. 25 replaced with −AUTOFD.

Figure 27:
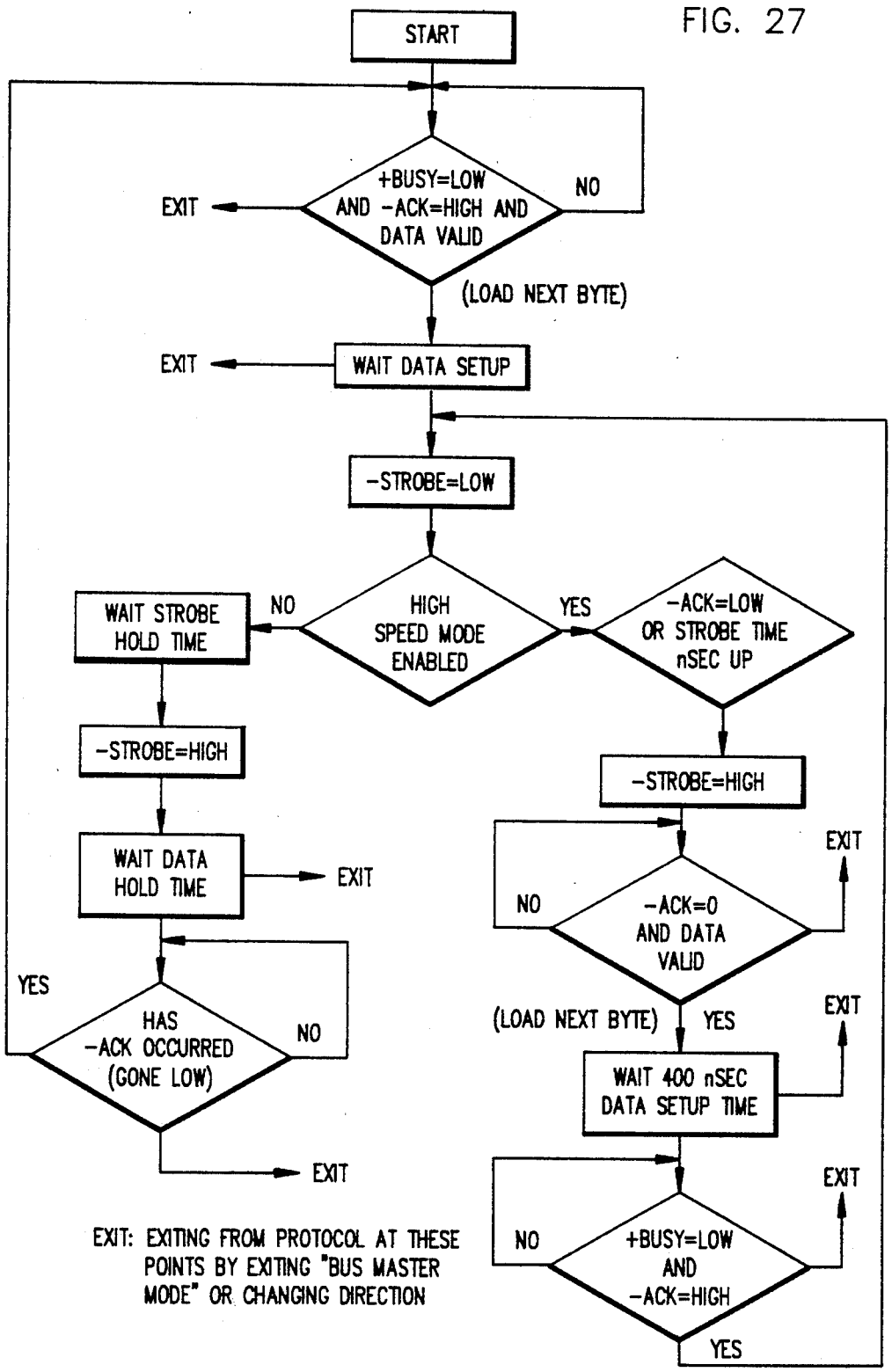
FIG. 27 is a flow chart showing a sending protocol in the data processor for transmitting bytes.
Figure 28:
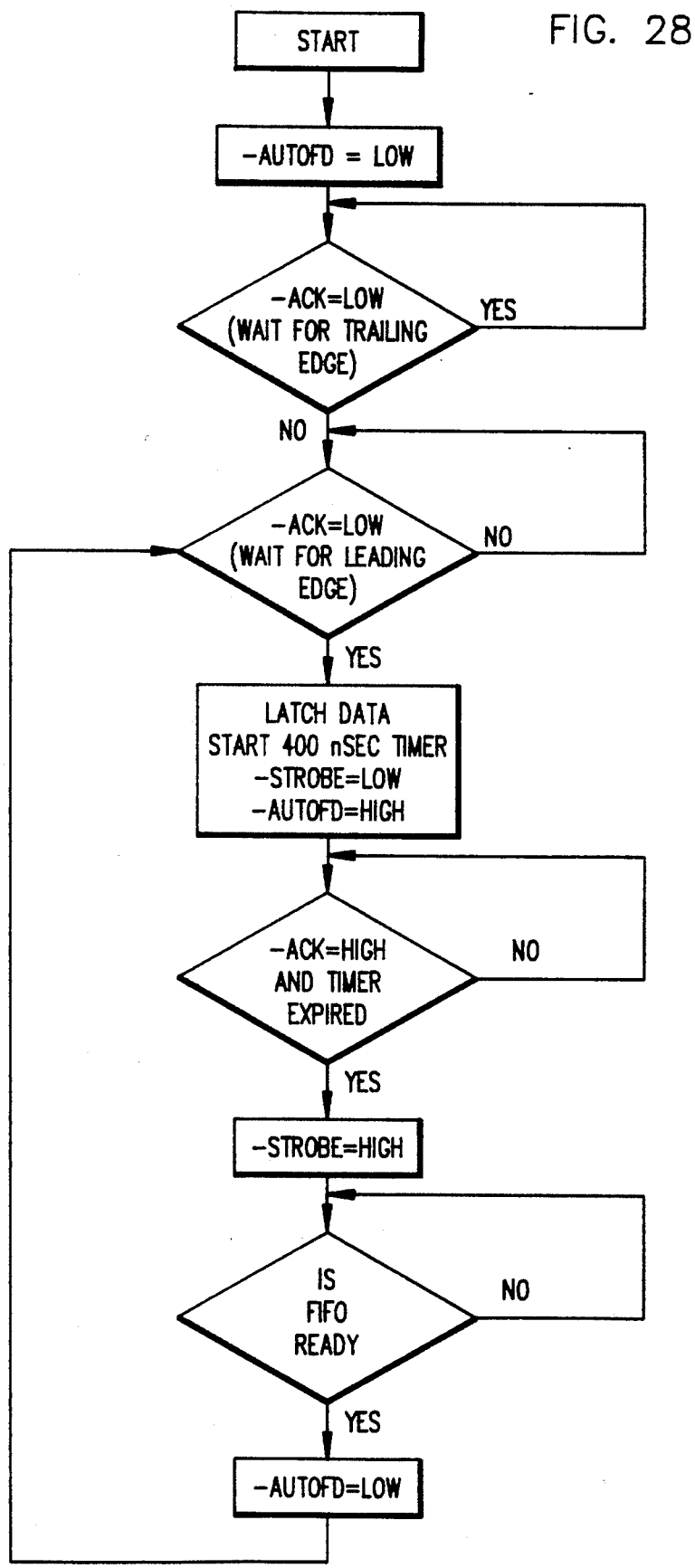
FIG. 28 is a flow chart showing a receiving protocol in the data processor for receiving bytes.

The "Closed Loop Handshake" requires the PS/2 computer 40 to have the sending protocol of FIG. 27 when transmitting from the PS/2 computer 40 to the printer 41; the sending protocol is part of an integrated circuit in the PS/2 computer 40. In the flow chart of FIG. 27, the value for each of Data Setup, Strobe Hold, and Data Hold times is the same as that required for automatic STROBE generation. The "Closed Loop Handshake" requires the PS/2 computer 40 to have the receiving protocol of FIG. 28 when the PS/2 computer 40 is receiving bytes from the printer 41; the receiving protocol is part of the same integrated circuit as the sending protocol of FIG. 27.

To produce and receive the various signals, three different drivers and one receiver are utilized in the printer 41 and two of the three drivers and the receiver are employed in the PS/2 computer 40. The drivers are a tri-state (TS) driver, an open collector (OC) driver, and a totem pole (TP) driver. The receiver is an LSTTL (LS) receiver. Each of the devices has key electrical characteristics required by the interface.

The tri-state driver must be able to be tri-stated and present a minimum impedance of 20K ohms to +5 volts or ground when tri-stated. When the tri-state driver is enabled, it must be able to sink at least 24 milliamps with a maximum down level of 0.5 volt and must be able to source at least 15 milliamps with a minimum up level of 2 volts. The tri-state driver must be able to sustain a voltage on its output as much as 5.5 volts above its VCC when powered off. Suitable examples of the tri-state driver are 74LS244, 74LS245, 74F125, and 74F126.

The open collector driver must be able to sink at least 16 milliamps with a maximum down level of 0.5 volt. When the open collector driver is off, it must present a minimum impedance of 100K ohms to ground. The open collector driver must be able to sustain a voltage on its output as much as 5.5 volts above its VCC when powered off. Suitable examples of the open collector driver are 7406 and 7407.

The totem pole driver must be able to sink at least 24 milliamps with a maximum down level of 0.5 volt and must be able to source at least 15 milliamps with a minimum up level of 2 volts. The totem pole driver also must be able to sustain a voltage on its output as much as 5.5 volts above its VCC when powered off. Suitable examples of the totem pole driver are 74LS244, 74LS245, 74F125, and 74F126.

The LSTTL receiver must have a minimum high level input voltage of 2 volts and a maximum low level input voltage of 0.8 volt. The LSTTL receiver requires a maximum of 1.6 milliamps of sink current and 40 microamps of source current from its driver. The LSTTL receiver must be able to sustain a voltage on its input as much as 5.5 volts above its VCC when powered off. Suitable examples of the LSTTL receiver are 74LS04, 74LS244, and 74LS245.

Figure 29:
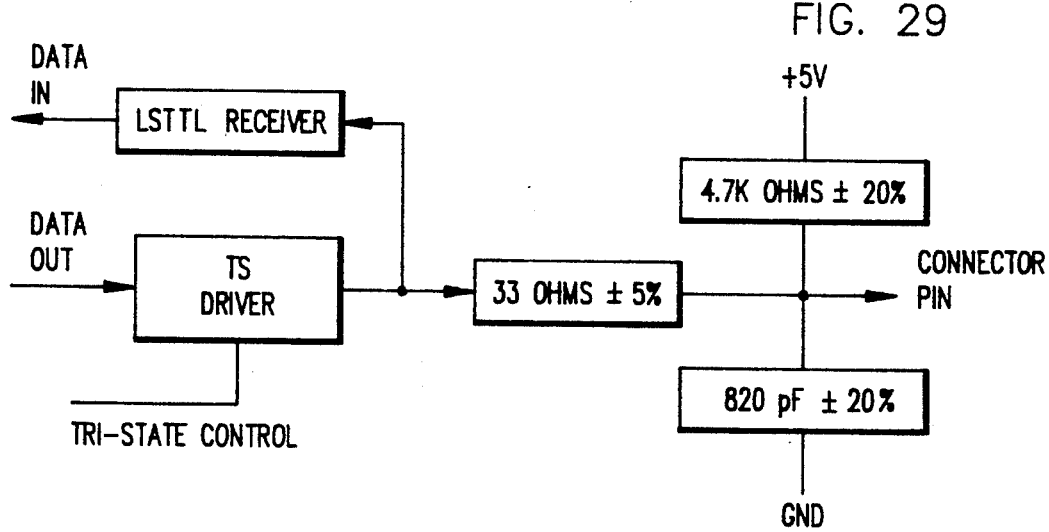
FIG. 29 is a block diagram of a driver and receiver circuit in the data processor for producing or receiving information signals over one of the eight information lines between the data processor and the printer.

The PS/2 computer 40 has driver and receiver circuits for receiving and transmitting data and status information. One of the circuits, which are equal in number to eight information lines between the PS/2 computer 40 and the printer 41, is shown in FIG. 29.

Figure 30:
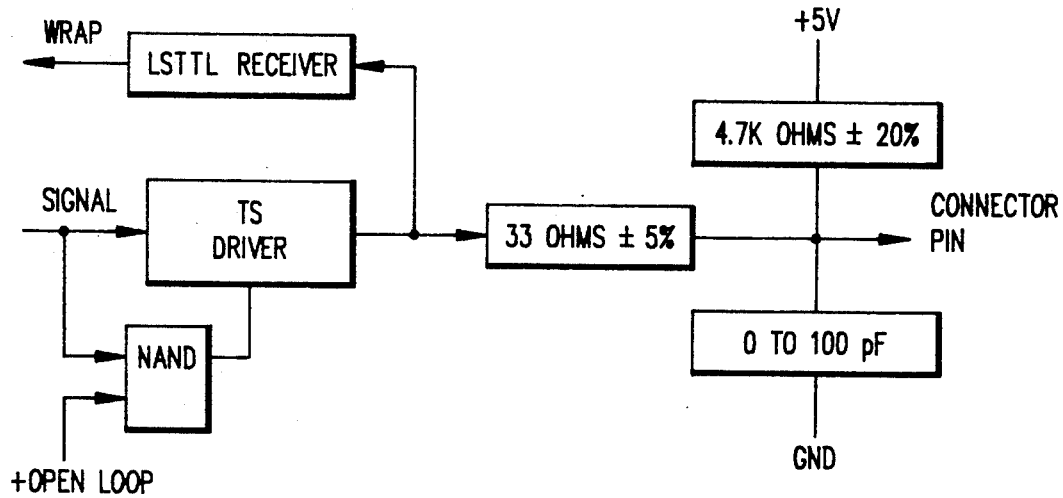
FIG. 30 is a block diagram of a driver circuit in the data processor for producing a −STROBE or −AUTOFD signal as its output.

Each of the −STROBE and −AUTOFD signals is produced by a driver circuit (see FIG. 30) in the PS/2 computer 40. Thus, there are two of the driver circuits of FIG. 30 in the PS/2 computer 40.

Figure 31:
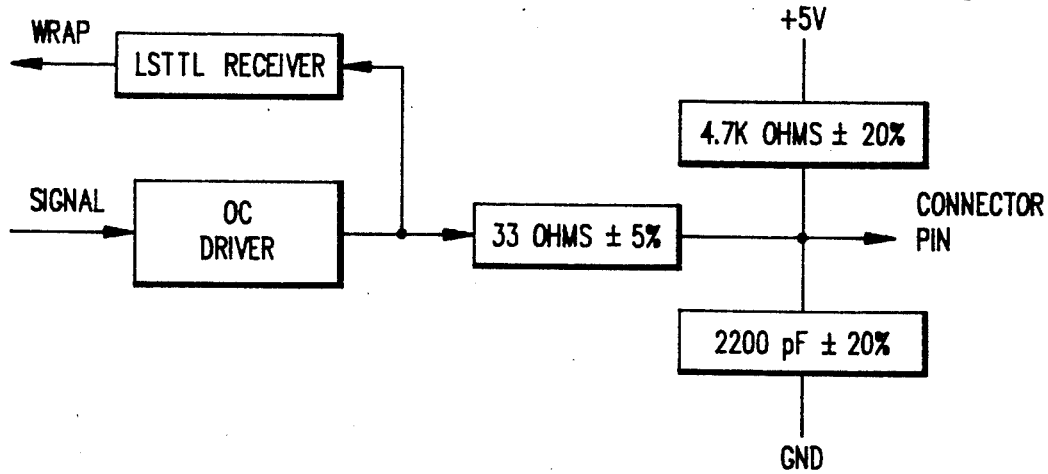
FIG. 31 is a block diagram of a driver circuit in the data processor for producing an −INIT or −SLCTIN signal as its output.

Each of the −INIT and −SLCTIN signals is produced by a driver circuit (see FIG. 31) in the PS/2 computer 40. Accordingly, there are two of the driver circuits of FIG. 31 in the PS/2 computer 40.

Figure 32:
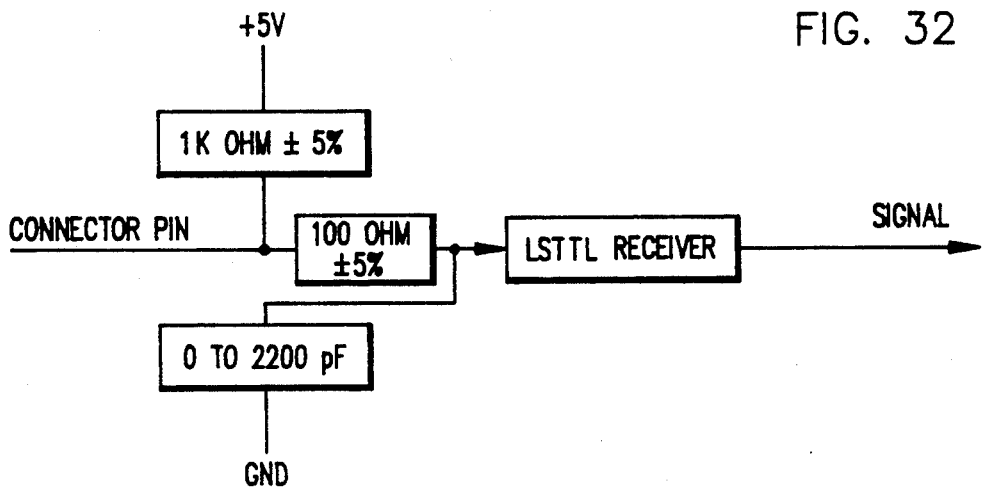
FIG. 32 is a block diagram of a receiver circuit in the data processor for receiving a −ERROR, +SLCT, or +PE signal from the printer.
Figure 33:
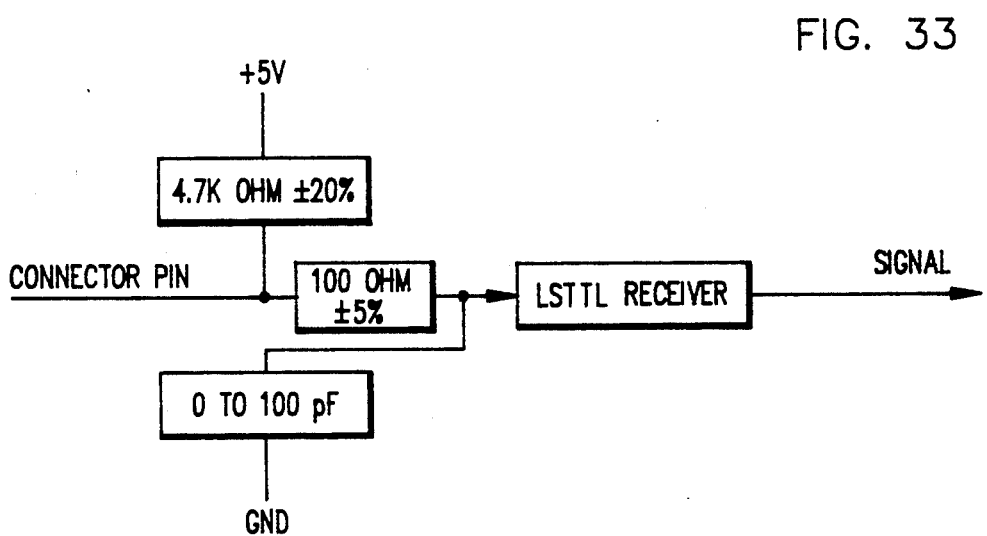
FIG. 33 is a block diagram of a receiver circuit in the data processor for receiving a −ACK or +BUSY signal from the printer.

The PS/2 computer 40 has three separate receiver circuits (see FIG. 32) for receiving −ERROR, +SLCT, and +PE signals from the printer 41. The PS/2 computer 40 has two separate receiver circuits (see FIG. 33) for receiving −ACK and +BUSY signals from the printer 41.

Figure 34:
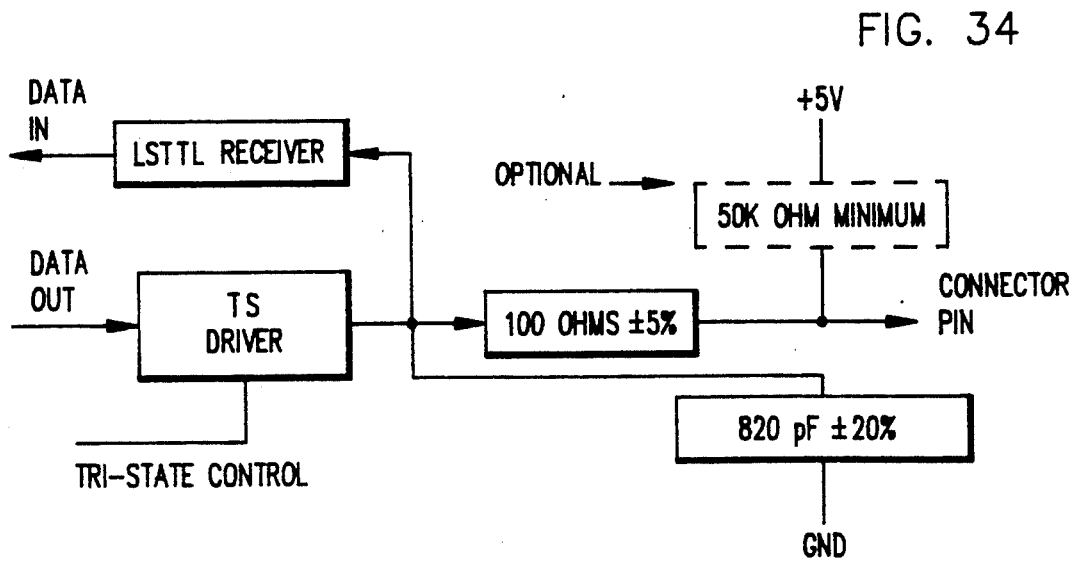
FIG. 34 is a block diagram of a driver and receiver circuit in the printer for producing or receiving information signals over one of the eight information lines between the data processor and the printer.

The printer 41 has driver and receiver circuits for receiving and transmitting information. One of the driver and receiver circuits, which are equal in number to the eight information lines between the PS/2 computer 40 and the printer 41, is shown in FIG. 34.

Figure 35:
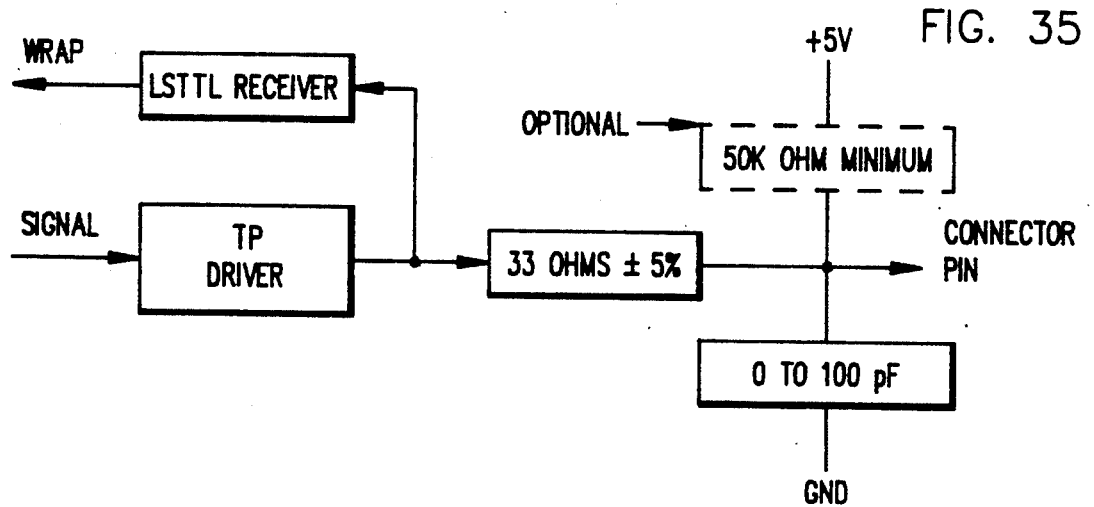
FIG. 35 is a block diagram of a driver circuit in the printer for producing a +BUSY signal as its output.
Figure 36:
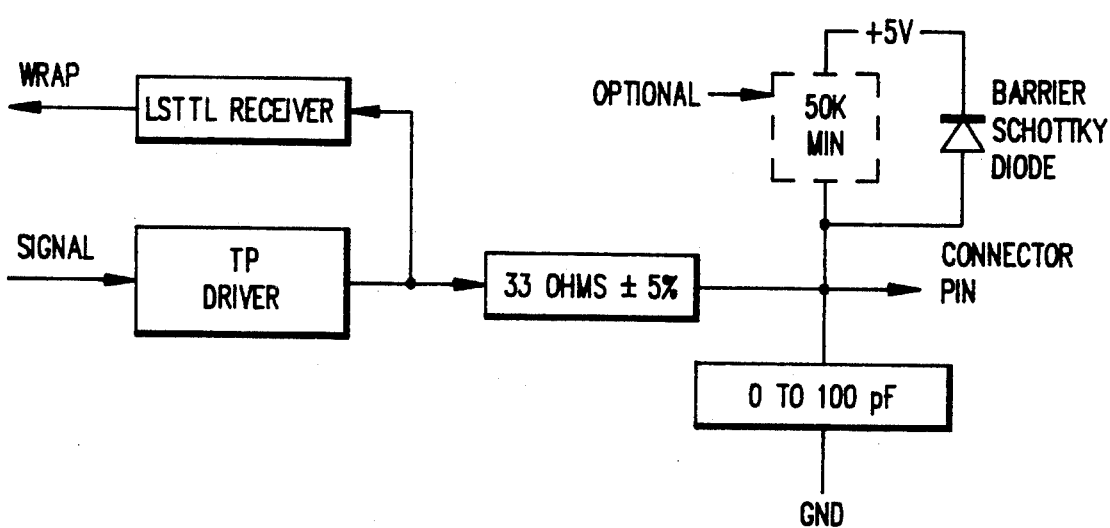
FIG. 36 is a block diagram of a driver circuit in the printer for producing a −ACK signal as its output.

The printer 41 has a driver circuit (see FIG. 35) for producing the +BUSY signal. The printer 41 has a driver circuit (see FIG. 36) for producing the −ACK signal.

Figure 37:
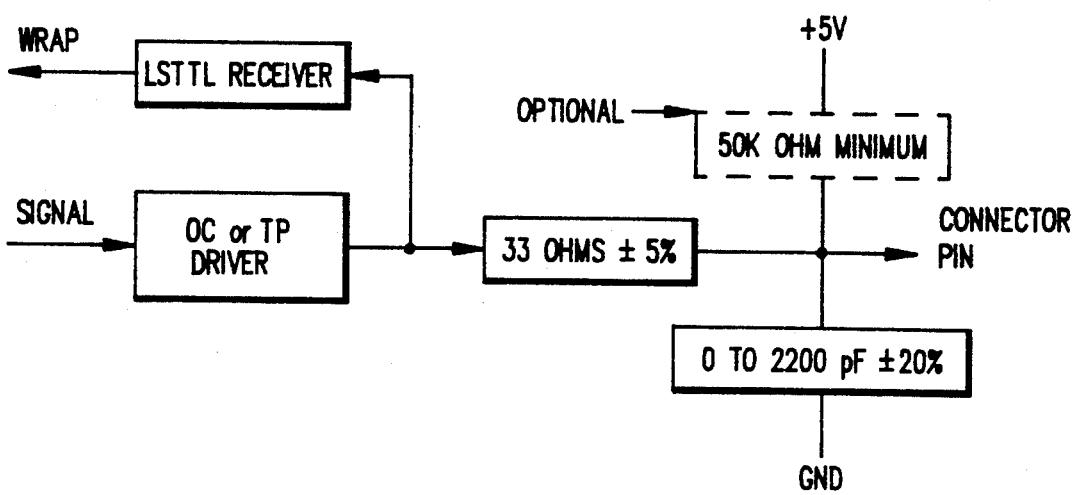
FIG. 37 is a block diagram of a driver circuit in the printer for producing a −ERROR, +SLCT, or +PE signal as its output.

Each of the −ERROR, +SLCT, and +PE signals is produced by a separate driver circuit (see FIG. 37) in the printer 41. Thus, the printer has three of the driver circuits of FIG. 37.

Figure 38:
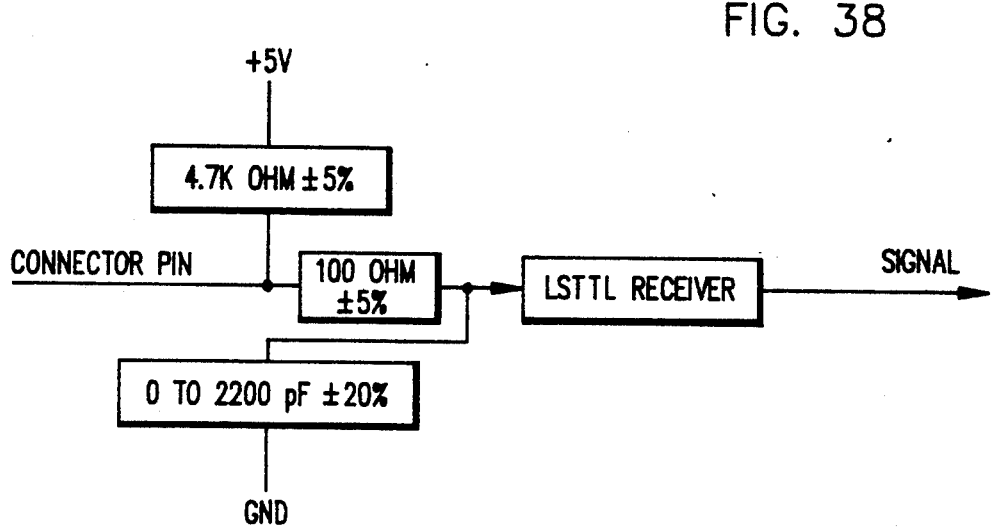
FIG. 38 is a block diagram of a receiver circuit in the printer for receiving a −INIT or −SLCTIN signal from the data processor.
Figure 39:
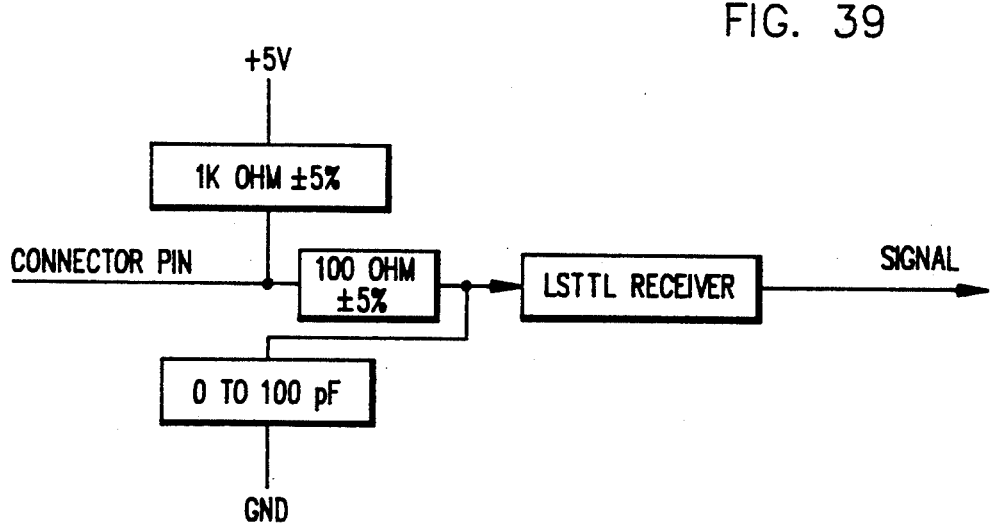
FIG. 39 is a block diagram of a receiver circuit in the printer for receiving a −STROBE or −AUTOFD from the data processor.

Each of the −INIT and −SLCTIN signals from the PS/2 computer 40 is received at the printer 41 through a separate receiver circuit (see FIG. 38). Each of the −STROBE and −AUTOFD signals from the PS/2 computer 40 is received at the printer 41 through a separate receiver circuit (see FIG. 39).

Figure 40:
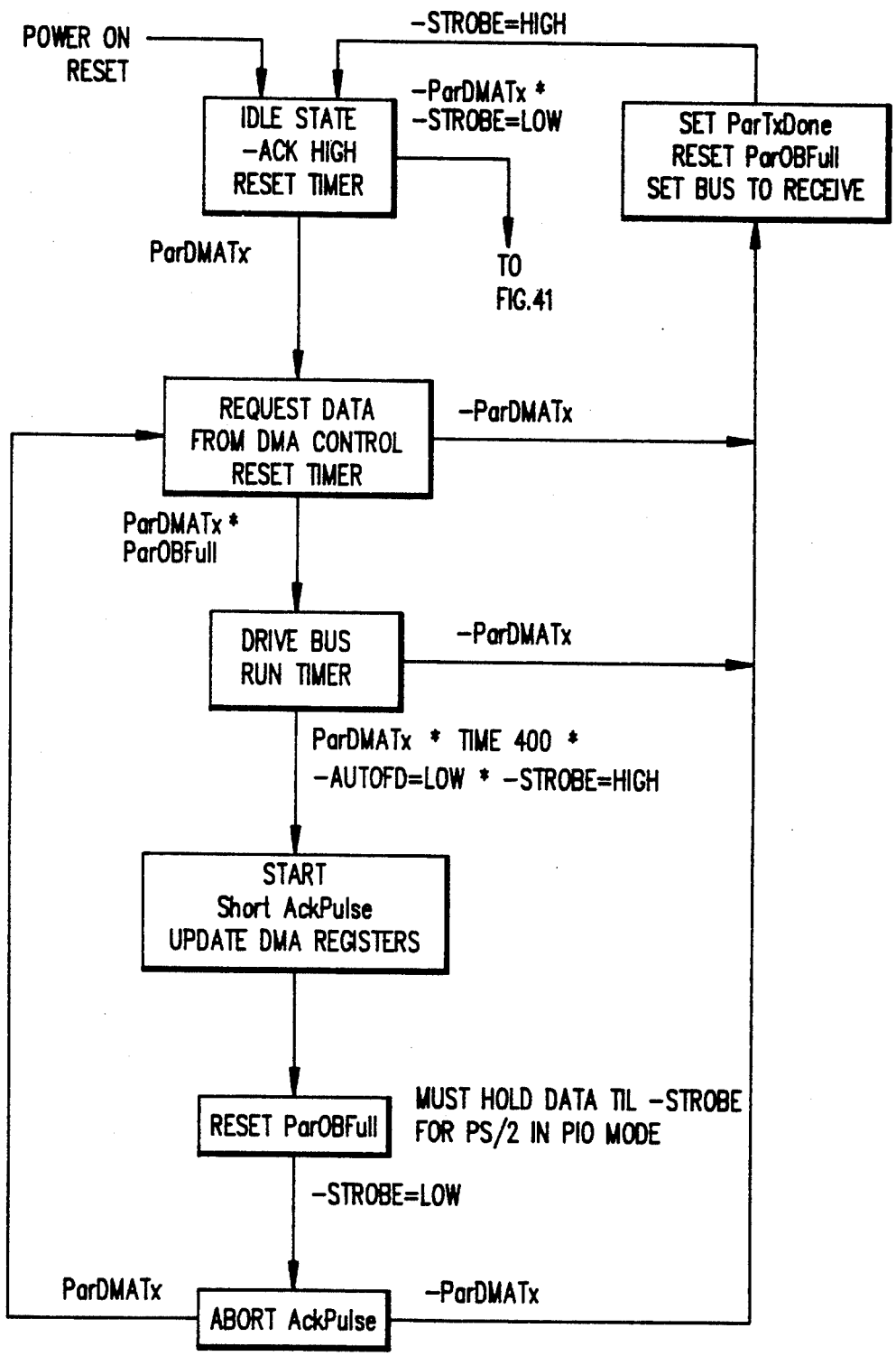
FIG. 40 is a diagram of transmit hardware states for the printer.

The closed loop transmit process, which is performed on a byte to byte basis by the hardware of the printer 41, is shown in a hardware state diagram in FIG. 40. It is assumed that the Direct Memory Access (DMA) ability is in the printer 41 with independent transmit and receive DMA channels.

The following are definitions of terms used in conjunction with FIG. 40 with the asterisk (*) meaning AND:

TxDMAArm: Set or Reset by microcode of the printer 41 to enable or disenable DMA transmit. This bit should be set low before modifying any Transmit DMA controls since this bit is sampled by the Synchronous Control Machine to make branching decisions.

TxDMAPar/Ser: Set or Reset by the microcode of the printer 41 to set the port for transmit with a logical one for parallel transmission and a logical zero for serial transmission.

TxCount=0: This indicates that the Transmit DMA's transfer account has been exhausted.

ParOBFull (Parallel Output Buffer Full): Set when the DMA controller loads Parallel Macro to indicate Data Available. Reset when the data is successfully transmitted.

ParDMATx: TxDMAArm * TxDMAPar/Ser * TxCount=0

ParTxDone: Set when authorized parallel transmit is done. This causes interrupt of a program in the printer 41 so that another program in the printer 41 can execute. Reset by the microcode of the printer 41.

Time400: Goes active 400 nanoseconds after started to insure the 400 nanosecond set up time is met.

Short AckPulse: Drives −ACK low for 500 nanoseconds.

Figure 41:
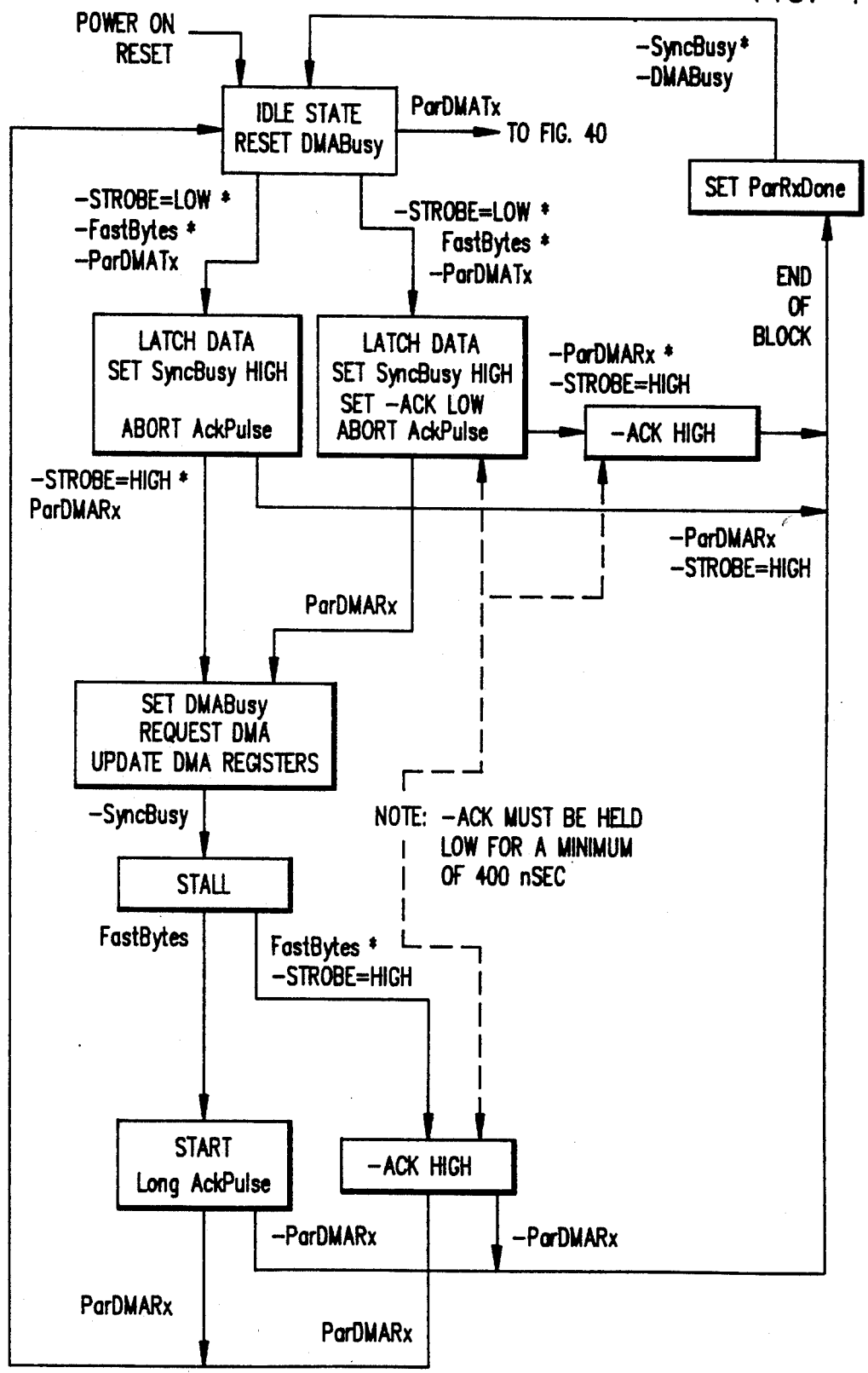
FIG. 41 is a diagram of receive hardware states for the printer.

The receive process, which is performed on a byte to byte basis by the printer 41, is shown in a hardware state diagram (see FIG. 41).

The following are definitions of terms used in conjunctions with FIG. 41 with the asterisk (*) meaning AND:

RxDMAArm: Set or Reset by microcode of the printer 41 to enable or disable DMA Receive. This byte should be set low before modifying any Receive DMA controls since this bit is sampled by the Synchronous Control Machine to make branching decisions.

RxDMAPar/Ser: Set or Reset by the microcode of the printer 41 to set the port for receipt with a logical one for parallel transmission and a logical zero for serial transmission.

RxCount=0: This indicates that the Receive DMA's transfer count has been exhausted.

−INIT: Parallel interface signal −INIT.

RxData/Status: Set or Reset by microcode of the printer 41 to tell the hardware the expected state of the −INIT line during reception.

INITMisMatch: This indicates that the −INIT signal at the time of the last received −STROBE did not match RxData/Status.

ParDMARx:
RxDMAArm * RxDMAPar/Ser * $\overline{\text{RxCount}=0}$ * $\overline{\text{INITMisMatch}}$ * $\overline{\text{MatchQ}}$ ParDMATx: Same as for FIG. 40.

FastBytes: Set or Reset by the microcode of the printer 41 to enable or disable "Closed Loop Handshake" receiving.

SyncBusy: Set when a byte is received. Reset when DMA reads the data from the parallel port or when the microcode reads the parallel port and the received hardware is in the "SET ParRxDone" state.

DMABusy: Used to hold the +BUSY signal to the PS/2 computer 40 at the end of DMA transfers. Reset by hardware or microcode.

AbortRx: Set if Synchronous Control Machine is waiting for −STROBE(idle) and RxDMAArm is reset. This causes interrupt of a program in the printer 41 so that another program in the printer 41 can execute. Reset by software.

ParRxDone: Active when authorized parallel reception is done. This causes interrupt of a program in the printer 41 so that another program in the printer 41 can execute.

Long AckPulse: Drives −ACK low for 2–4 microseconds.

ArmDPQ: Set or Reset by microcode of the printer 41 to enable or disable the Deselect on Positive Query (DPQ) comparator.

MatchESC (Match Escape): Set when data is latched if data=hexadecimal 1B. Reset by hardware or microcode.

MatchQ: Set when data is latched if data=hexadecimal 51 and MatchESC is set. Reset by hardware or microcode.

The following is an example of how bytes are transmitted by the "Closed Loop Handshake":

| Transmitter (PS/2 Computer 40) | Receiver (Printer 41) |
| --- | --- |
| 1. Place new data on DATA 1-8 pins. | 1. Set pacing control signal (+BUSY low) and confirming clock (−ACK high) inactive. |
| 2. Wait minimum data setup time (T1 of FIG. 26). | |
| 3. Wait for receiver's pacing control signal (+BUSY low) and confirming clock (−ACK high) to be inactive. | |
| 4. Generate leading edge of clock (−STROBE low). | 2. Read data from interface because of −STROBE being low. |
| | 3. Set pacing control signal (+BUSY high) and confirming clock (−ACK low) active. |
| | 4. Save the data. |
| 5. Wait for either the clock time out (T7 of FIG. 26) to expire or the leading edge of the receiver's | 5. If minimum confirming clock time (T8 of FIG. 26) has expired and transmitter's clock |

| Transmitter (PS/2 Computer 40) | Receiver (Printer 41) |
|---|---|
| confirming clock (−ACK going low). | (−STROBE high) is inactive, set confirming clock (−ACK high) inactive. |
| 6. Generate trailing edge of clock (−STROBE high). | |
| 7. If not already detected, wait for the leading edge of confirming clock (−ACK going low). | |
| 8. If more to transmit, go to Step 1. | 6. Process data, and go to Step 1. |

The PS/2 computer 40 and the printer 41 interact to provide a function or recover from a situation. An example of the PS/2 computer 40 and the printer 41 interacting when the printer 41 informs the PS/2 computer 40 of completion of a job is as follows:

| PS/2 Computer 40 | Printer 41 |
|---|---|
| Send page description for last page of a job via "Data" channel. | Accept, buffer, and process page description as received. |
| Notify printer that job is ended via "Data" channel by specific sequence of bytes on "Data" channel. | Note previous page as last page of job. |
| Begin sending first page of another job to printer via "Data" channel. | While accepting, buffering, and processing incoming page description, last page of a previously received job is completely printed. Activate "Service Request" signal (+PE goes low) while still accepting, buffering, and processing incoming page description. |
| Notice that "Service Request" is active and suspend sending page description via "Data" channel. Release interface by going to NOT READY TO RECEIVE state. | Continue processing previously received page description. |
| Request interface for "Status" channel (CHANNEL BREAK) by both RTS (−SLCTIN) and StQ (−INIT) going low simultaneously. Transmit a "What" question via "Status" channel. Release interface by going to NOT READY TO RECEIVE (−SLCTIN and −INIT high) state. | Note request for "Status" channel by −SLCTIN and −INIT going low simultaneously and prepare to receive a question. Accept question. Deactivate "Service Request" signal (−PE goes high). |
| | Prepare "Job Complete" reply to "What" question from sequence of bytes in memory. Request interface for "Status" channel (CHANNEL BREAK) by +SLCT and −ERROR going down. |
| Note request for "Status" channel and prepare to receive answer by going to READY TO RECEIVE state. Accept answer. | Transmit "Job Complete" reply via "Status" channel. Release interface by +SLCT and −ERROR going high. |
| Inform user that job printing is complete by software in the PS/2 computer 40 putting a message on its screen. Request interface for "Data" channel by −SLCTIN going | Note request for "Data" channel by −SLCTIN going |

| PS/2 Computer 40 | Printer 41 |
|---|---|
| low with −INIT staying high. | low and −INIT staying high and prepare to receive page description. |
| Resume suspended transmission of page description. | |

Another example of interaction between the PS/2 computer 40 and the printer 41 is when the PS/2 computer 40 requests the printer 41 to use a font that is not in the memory of the printer 41.

The operations are as follows:

| PS/2 Computer 40 | Printer 41 |
|---|---|
| Within page description, a special font not present in the printer 41 is requested. Continue sending page description. | While processing page description, note request for font that is not available. Block further transmission at end of byte via "Data" channel by the microcode of the printer 41 causing +BUSY to go high and stay high. |
| Notice "Service Request" signal. Suspend page description via "Data" channel. | Set "Service Request" signal active (+PE goes low). |
| Release interface by −SLCTIN going high. | |
| Request interface for "Status" channel (CHANNEL BREAK) by setting −SLCTIN and −INIT low simultaneously: | Note request for "Status" channel and prepare to receive a question by +BUSY going low. |
| Transmit "What" question via "Status" channel. Release interface by −INIT and −SLCTIN going high. | Accept question via "Status" channel. |
| | Deactivate "Service Request" signal (+PE goes high). Prepare "Font Fault" reply out of memory to "What" question |
| Note request for "Status" channel and prepare to receive reply by −AUTOFD going low. | Request interface for "Status" channel by both +SLCT and −ERROR going low. |
| | Transmit "Font Fault" reply via "Status" channel. Release interface by +SLCT and −ERROR going high. Unblock transmission via "Data" channel by the microcode of the printer 41 causing +BUSY to go low and stay low. |
| Software informs user of Font Fault and gains approval to substitute. Request interface for "Status" channel (CHANNEL BREAK) by setting −SLCTIN and −INIT simultaneously low | Note Request for "Status" channel and prepare to receive a question (+BUSY low). |
| Transmit "Substitute Approval" to printer via "Status" channel. Release interface by setting −SLCTIN and −INIT high. | Accept "Status" channel transmission. Process substitution approval. Prepare "Font" Substitute" reply from memory. |
| Note request for "Status" channel and prepare to receive reply by −AUTOFD going low. | Request Interface for "Status" channel by +SLCT and −ERROR going low. |

-continued

| PS/2 Computer 40 | Printer 41 |
|---|---|
| Accept Reply. | Transmit "Font Substitute." Release interface by +BUSY going high. |
| Request Interface for "Data" channel by setting −SLCTIN low with −INIT high. | Note request for "Data" channel and prepare to receive page description by setting +BUSY low. |
| Resume sending page description via "Data" channel. | |

A third example of interaction between the PS/2 computer 40 and the printer 41 is when there is a remote operator panel query for paper size. The operations are as follows:

| PS/2 Computer 40 | Printer 41 |
|---|---|
| While page description is being sent to printer, a separate Operator Panel task (a software program) in the PS/2 computer 40 determines it needs to ask the printer a question. | Accept, buffer, and process page description. |
| The Operator Panel task causes another software program in the PS/2 computer 40 to suspend sending page description. Release interface by setting −SLCTIN high. | Continue processing page description already received. |
| Request Interface for "Status" channel (CHANNEL BREAK) by setting −SLCTIN and −INIT low simultaneously. Transmit "Query Paper Size" question. Release interface by setting −SLCTIN and −INIT high. | Note Request for "Status" channel and prepare to receive a question by setting +BUSY low. Accept "Status" channel transmission. |
| | Prepare answer to question from memory. |
| Note request for "Status" channel and prepare to receive answer to question by setting −AUTOFD low. | Request Interface for "Status" channel by setting +SLCT and −ERROR low. |
| Receive answer via "Status" channel. | Transmit answer via "Status" channel. Release Interface by setting −SLCT and −ERROR high. |
| Pass answer to Operator Panel task. | |
| Request Interface for "Data" channel by setting −SLCTIN low with −INIT high. | Note request for "Data" channel and prepare to receive page description by setting +BUSY low. |
| Resume sending page description via "Data" channel. | Receive, buffer, and process page description. |

An advantage of this invention is that an interface can be used with a unidirectional or bi-directional printer. Another advantage of this invention is that it reduces the amount of memory for a printer to save when it receives a system control signal in comparison with when it receives a printer content signal. A further advantage of this invention is that channel bandwidth is increased so that the printing job is completed faster. Still another advantage of this invention is that the same information lines can be utilized to transmit data or status information between a data processor and a printer. A still further advantage of this invention is that there is no requirement for latching any data in a data processor. Yet another advantage of this invention is that there is no removal of information from the information lines until the information has been accepted by the receiver. A yet further advantage of this invention is that printer status can be ascertained by a user without the user being physically present at the printer. Yet still another advantage of this invention is that an inquiry can be sent to a printer from a data processor without interrupting the information stream to the printer. A yet still further advantage of this invention is that a printer can interrupt incoming information.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination:
    a data processor;
    a printer for printing based on information from said data processor;
    a plurality of lines connecting said data processor and said printer including a first line and a group of information lines;
    said data processor including first applying and transmitting means for applying a first predetermined signal on said first line for receipt by said printer and for transmitting information signals to said printer over said group of information lines after receipt by said printer of the first predetermined signal that the information signals are recognized by said printer as system control signals;
    and said data processor including second applying and transmitting means for applying a second predetermined signal on said first line for receipt by said printer and for transmitting information signals to said printer over said group of information lines after receipt by said printer of the second predetermined signal so that the information signals are recognized as print content signals by said printer.

2. The combination according to claim 1 in which:
    said plurality of lines includes a second line;
    and said printer includes applying and transmitting means for applying a third predetermined signal on said second line for receipt by said data processor and for transmitting status signals to said data processor over said group of information lines after receipt by said data processor of the third predetermined signal from said printer so as to be recognized by said data processor as status signals.

3. The combination according to claim 2 in which said data processor includes byte transmission causing means for causing transmission of the system control signals and the print content signals to said printer byte by byte.

4. The combination according to claim 3 in which said printer includes byte transmission causing means for causing transmission of signals to said data processor byte by byte.

5. The combination according to claim 1 in which said data processor includes byte transmission causing means for causing transmission of the system control signals and the print content signals to said printer byte by byte.

6. The combination according to claim 1 in which said data processor includes determining means for determining whether said printer is bi-directional and is responsive.

7. The combination according to claim 6 in which said determining means of said data processor includes:

supply means for supplying a determining signal to said printer;

and detecting means for detecting if the determining signal is received by said printer and said printer is bi-directional and responsive to the determining signal.

8. The combination according to claim 7 in which said detecting means includes:

receiving means for receiving a response signal from said printer if said printer is bi-directional and responsive to the determining signal from said supply means of said data processor;

and means for determining if the response signal from said printer is received within a predetermined period of time to enable said data processor to determine whether said printer is bi-directional and is responsive.

9. The combination according to claim 8 in which said printer includes response signal transmitting means for transmitting the response signal to said data processor within the predetermined period of time when the determining signal from said supply means of said determining means of said data processor is received by said printer and said printer is bi-directional and responsive to the determining signal.

10. The combination according to claim 1 in which said data processor includes supply means for supplying a determining signal to said printer to enable said data processor to determine whether said printer is bi-directional and is responsive.

11. The combination according to claim 10 in which said data processor includes:

receiving means for receiving a response signal from said printer if said printer is bi-directional and is responsive to the determining signal from said supply means of said data processor;

and means for determining if the response signal from said printer is received within a predetermined period of time to enable said data processor to determine whether said printer is bi-directional and is responsive.

12. The combination according to claim 11 in which said printer includes response signal transmitting means for transmitting the response signal to said data processor within the predetermined period of time when the determining signal from said supply means of said data processor is received by said printer and said printer is bi-directional and responsive to the determining signal.

13. In combination:

a data processor;

a printer for printing based on information from said data processor;

said data processor including:

first information transmitting means for causing transmission of system control signals to said printer;

and second information transmitting means for causing transmission of print content signals to said printer;

said printer including:

signal receiving means for receiving a first predetermined signal from said data processor that indicates that said first information transmitting means is going to cause transmission of system control signals to said printer;

and signal transmitting means for transmitting a second predetermined signal to said data processor to indicate that the first predetermined signal has been received and that the information caused to be transmitted by said first information transmitting means will be recognized by said printer as system control signals;

said data processor including:

first signal receiving means for receiving the second predetermined signal from said signal transmitting means of said printer;

and first control means for controlling said first information transmitting means so that said first information transmitting means does not cause transmission of the system control signals until said first signal receiving means of said data processor receives the second predetermined signal from said printer;

said signal receiving means of said printer receiving a third predetermined signal from said data processor to indicate that said second information transmitting means is going to cause transmission of print content signals to said printer;

said signal transmitting means of said printer transmitting the second predetermined signal to said data processor to indicate that the third predetermined signal has been received and that the information caused to be transmitted by said second information transmitting means will be recognized by said printer as print content signals;

said first signal receiving means of said data processor receiving the second predetermined signal from said signal transmitting means of said printer;

and said data processor including second control means for controlling said second information transmitting means so that said second information transmitting means does not cause transmission of the print content signals until said first signal receiving means of said data processor receives the second predetermined signal from said printer.

14. The combination according to claim 13 in which:

said printer includes information transmitting means for causing transmission of information to said data processor;

and said data processor includes:

second signal receiving means for receiving a fourth predetermined signal from said printer that indicates that said information transmitting means of said printer is going to cause transmission of information to said data processor;

and signal transmitting means for transmitting a fifth predetermined signal to said printer to indicate that the fourth predetermined signal has been received and that the information caused to be transmitted by said information transmitting means of said printer can be received by said data processor.

15. The combination according to claim 14 in which said data processor includes byte transmission causing means for causing transmission of the system control signals and the print content signals to said printer byte by byte.

16. The combination according to claim 15 in which said byte transmission causing means of said data processor includes byte transmission means for transmitting only one byte at a time until a byte receiving signal is received by said data processor from said printer to indicate that the one byte has been received by said printer.

17. The combination according to claim 16 in which said printer includes byte transmission causing means for causing transmission of signals to said data processor byte by byte.

18. The combination according to claim 17 in which said byte transmission causing means of said printer includes byte transmitting means for transmitting only one byte at a time until a byte receiving signal is received by said printer from said data processor to indicate that the one byte has been received by said data processor.

19. The combination according to claim 15 in which said printer includes byte transmission causing means for causing transmission of information to said data processor byte by byte.

20. The combination according to claim 14 in which:
said printer includes requesting means for causing production of a request signal to request said data processor to cause interruption of transmission of information by the active of said first information transmitting means and said second information transmitting means;
and said data processor including inactivating means for inactivating the active of said first information transmitting means and said second information transmitting means after receipt of a request signal from said requesting means of said printer and only at specific positions of the information transmitted by the active of said first information transmitting means and said second information transmitting means.

21. The combination according to claim 13 in which said data processor includes byte transmission causing means for causing transmission of the system control signals and the print content signals to said printer byte by byte.

22. The combination according to claim 21 in which said byte transmission causing means of said data processor includes byte transmitting means for transmitting only one byte at a time until a byte receiving signal is received by said data processor from said printer to indicate that the one byte has been received by said printer.

23. The combination according to claim 13 in which said data processor includes signal transmitting means for causing transmission of each of the first predetermined signal and the third predetermined signal to said printer.

24. The combination according to claim 13 in which said printer includes blocking means for blocking transmission of print content signals from said data processor at selected intervals of the print content signals.

25. The combination according to claim 13 in which said data processor includes supply means for supplying a determining signal to said printer to enable said data processor to determine whether said printer is bi-directional and is responsive.

26. The combination according to claim 25 in which said data processor includes:
receiving means for receiving a response signal from said printer if said printer is bi-directional and is responsive to the determining signal from said supply means of said data processor;
and means for determining if the response signal from said printer is received within a predetermined period of time to enable said data processor to determine whether said printer is bi-directional and is responsive.

27. The combination according to claim 26 in which said printer includes response signal transmitting means for transmitting the response signal to said data processor within the predetermined period of time when the determining signal from said supply means of said data processor is received by said printer and said printer is bi-directional and responsive to the determining signal.

28. The combination according to claim 13 in which said data processor includes determining means for determining whether said printer is bi-directional and is responsive.

29. The combination according to claim 28 in which said determining means of said data processor includes:
supply means for supplying a determining signal to said printer;
and detecting means for detecting if the determining signal is received by said printer and said printer is bi-directional and responsive to the determining signal.

30. The combination according to claim 29 in which said detecting means includes:
receiving means for receiving a response signal from said printer if said printer is bi-directional and responsive to the determining signal from said supply means of said data processor;
and means for determining if the response signal from said printer is received within a predetermined period of time to enable said data processor to determine whether said printer is bi-directional and is responsive.

31. The combination according to claim 30 in which said printer includes response signal transmitting means for transmitting the response signal to said data processor within the predetermined period of time when the determining signal from said supply means of said determining means of said data processor is received by said printer and said printer is bi-directional and responsive to the determining signal.

32. A printer for cooperation with a data processor to which said printer is connected by a plurality of lines including a group of information lines and at least two separate lines, said printer including:
signal receiving means for receiving a first predetermined signal from the data processor over at least one of the separate lines to indicate to said printer that system control signals are to be transmitted to said printer from the data processor over the group of information lines upon acknowledgement by said printer to the data processor of receipt of the first predetermined signal;
transmitting means for transmitting a second predetermined signal to the data processor over at least one other of the separate lines to acknowledge to the data processor receipt of the first predetermined signal;
information receiving means for receiving the system control signals from the data processor over the group of information lines;
said signal receiving means receiving a third predetermined signal from the data processor over the at least one separate line to indicate to said printer that print content signals are to be transmitted to said printer from the data processor over the group of information lines upon acknowledgement by said printer of receipt of the third predetermined signal;
said transmitting means transmitting the second predetermined signal to the data processor over at least the other one of the separate lines to acknowledge to the data processor receipt of the third predetermined signal;
and said information receiving means receiving the print content signals from the data processor over the group of information lines.

* * * * *

UNITED STATES PATENT AND TRADEMARK OFFICE
CERTIFICATE OF CORRECTION

PATENT NO. : 5,239,627
DATED : August 24, 1993
INVENTOR(S) : James L. Beck, et. al.

It is certified that error appears in the above-indentified patent and that said Letters Patent is hereby corrected as shown below:

Title page, item [73], Assignee: After "International Business Machine Corporation, Armonk, New York insert--Lexmark International, Inc., Greenwich, Conn --.

Signed and Sealed this

Thirtieth Day of May, 1995

Attest:

BRUCE LEHMAN

Attesting Officer

Commissioner of Patents and Trademarks